(12) United States Patent
Pflug

(10) Patent No.: US 9,751,465 B2
(45) Date of Patent: Sep. 5, 2017

(54) VEHICLE VISION SYSTEM WITH REDUCED IMAGE COLOR DATA PROCESSING BY USE OF DITHERING

(71) Applicant: MAGNA ELECTRONICS INC., Auburn Hills, MI (US)

(72) Inventor: Goerg Pflug, Weil der Stadt (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 405 days.

(21) Appl. No.: 14/391,841

(22) PCT Filed: Apr. 16, 2013

(86) PCT No.: PCT/US2013/036701
§ 371 (c)(1),
(2) Date: Oct. 10, 2014

(87) PCT Pub. No.: WO2013/158592
PCT Pub. Date: Oct. 24, 2013

(65) Prior Publication Data
US 2015/0070500 A1    Mar. 12, 2015

Related U.S. Application Data

(60) Provisional application No. 61/680,883, filed on Aug. 8, 2012, provisional application No. 61/624,507, filed on Apr. 16, 2012.

(51) Int. Cl.
*B60R 1/00* (2006.01)
*H04N 9/70* (2006.01)
*H04N 9/04* (2006.01)

(52) U.S. Cl.
CPC ............. *B60R 1/00* (2013.01); *H04N 9/045* (2013.01); *H04N 9/70* (2013.01); *B60R 2300/10* (2013.01); *B60R 2300/30* (2013.01)

(58) Field of Classification Search
None
See application file for complete search history.

(56) References Cited

U.S. PATENT DOCUMENTS 3,971,065 A    7/1976    Bayer
4,238,760 A    12/1980   Carr et al.
(Continued)

OTHER PUBLICATIONS

Ostromoukhov, "A Simple and Efficient Error-Diffusion Algorithm", Proceedings of SIGGRAPH 2001, in ACM Computer Graphics, Annual Conference Series, pp. 567-572, 2001.
(Continued)

*Primary Examiner* — Kate Luo
(74) *Attorney, Agent, or Firm* — Gardner, Linn, Burkhart & Flory, LLP

(57) ABSTRACT

A vision system for a vehicle includes a camera disposed at the vehicle and having a field of view exterior of the vehicle. The camera includes an RGB photosensor array having multiple rows of photosensing elements and multiple columns of photosensing elements. An in-line dithering algorithm is applied to individual lines of photosensing elements of the photosensor array in order to reduce at least one of color data transmission and color data processing. The in-line dithering algorithm includes at least one of an in-row dithering algorithm that is applied to individual rows of photosensing elements of the photosensor array and an in-column dithering algorithm that is applied to individual columns of photosensing elements of the photosensor array. The in-line dithering algorithm may be operable to determine most significant bits and least significant bits of color data of photosensing elements of the photosensor array.

14 Claims, 13 Drawing Sheets

(56) References Cited

U.S. PATENT DOCUMENTS

| | | | |
|---|---|---|---|
| 4,987,357 | A | 1/1991 | Masaki |
| 5,001,558 | A | 3/1991 | Burley et al. |
| 5,003,288 | A | 3/1991 | Wilhelm |
| 5,012,082 | A | 4/1991 | Watanabe |
| 5,016,977 | A | 5/1991 | Baude et al. |
| 5,027,001 | A | 6/1991 | Torbert |
| 5,027,200 | A | 6/1991 | Petrossian et al. |
| 5,059,877 | A | 10/1991 | Teder |
| 5,086,253 | A | 2/1992 | Lawler |
| 5,096,287 | A | 3/1992 | Kakinami et al. |
| 5,097,362 | A | 3/1992 | Lynas |
| 5,121,200 | A | 6/1992 | Choi |
| 5,130,709 | A | 7/1992 | Toyama et al. |
| 5,170,374 | A | 12/1992 | Shimohigashi et al. |
| 5,172,235 | A | 12/1992 | Wilm et al. |
| 5,177,685 | A | 1/1993 | Davis et al. |
| 5,182,502 | A | 1/1993 | Slotkowski et al. |
| 5,184,956 | A | 2/1993 | Langlais et al. |
| 5,189,561 | A | 2/1993 | Hong |
| 5,193,000 | A | 3/1993 | Lipton et al. |
| 5,204,778 | A | 4/1993 | Bechtel |
| 5,208,701 | A | 5/1993 | Maeda |
| 5,245,422 | A | 9/1993 | Borcherts et al. |
| 5,276,389 | A | 1/1994 | Levers |
| 5,285,060 | A | 2/1994 | Larson et al. |
| 5,289,182 | A | 2/1994 | Brillard et al. |
| 5,289,321 | A | 2/1994 | Secor |
| 5,307,136 | A | 4/1994 | Saneyoshi |
| 5,309,137 | A | 5/1994 | Kajiwara |
| 5,313,072 | A | 5/1994 | Vachss |
| 5,325,096 | A | 6/1994 | Pakett |
| 5,325,386 | A | 6/1994 | Jewell et al. |
| 5,329,206 | A | 7/1994 | Slotkowski et al. |
| 5,331,312 | A | 7/1994 | Kudoh |
| 5,336,980 | A | 8/1994 | Levers |
| 5,341,437 | A | 8/1994 | Nakayama |
| 5,351,044 | A | 9/1994 | Mathur et al. |
| 5,355,118 | A | 10/1994 | Fukuhara |
| 5,374,852 | A | 12/1994 | Parkes |
| 5,374,956 | A * | 12/1994 | D'Luna .................. H04N 9/045 348/275 |
| 5,386,285 | A | 1/1995 | Asayama |
| 5,394,333 | A | 2/1995 | Kao |
| 5,406,395 | A | 4/1995 | Wilson et al. |
| 5,410,346 | A | 4/1995 | Saneyoshi et al. |
| 5,414,257 | A | 5/1995 | Stanton |
| 5,414,461 | A | 5/1995 | Kishi et al. |
| 5,416,313 | A | 5/1995 | Larson et al. |
| 5,416,318 | A | 5/1995 | Hegyi |
| 5,416,478 | A | 5/1995 | Morinaga |
| 5,424,952 | A | 6/1995 | Asayama |
| 5,426,294 | A | 6/1995 | Kobayashi et al. |
| 5,430,431 | A | 7/1995 | Nelson |
| 5,434,407 | A | 7/1995 | Bauer et al. |
| 5,440,428 | A | 8/1995 | Hegg et al. |
| 5,444,478 | A | 8/1995 | Lelong et al. |
| 5,451,822 | A | 9/1995 | Bechtel et al. |
| 5,461,357 | A | 10/1995 | Yoshioka et al. |
| 5,469,298 | A | 11/1995 | Suman et al. |
| 5,471,515 | A | 11/1995 | Fossum et al. |
| 5,475,494 | A | 12/1995 | Nishida et al. |
| 5,498,866 | A | 3/1996 | Bendicks et al. |
| 5,500,766 | A | 3/1996 | Stonecypher |
| 5,510,983 | A | 4/1996 | Iino |
| 5,515,448 | A | 5/1996 | Nishitani |
| 5,521,633 | A | 5/1996 | Nakajima et al. |
| 5,528,698 | A | 6/1996 | Kamei et al. |
| 5,529,138 | A | 6/1996 | Shaw et al. |
| 5,530,240 | A | 6/1996 | Larson et al. |
| 5,530,420 | A | 6/1996 | Tsuchiya et al. |
| 5,535,314 | A | 7/1996 | Alves et al. |
| 5,537,003 | A | 7/1996 | Bechtel et al. |
| 5,539,397 | A | 7/1996 | Asanuma et al. |
| 5,541,590 | A | 7/1996 | Nishio |
| 5,550,677 | A | 8/1996 | Schofield et al. |
| 5,555,555 | A | 9/1996 | Sato et al. |
| 5,568,027 | A | 10/1996 | Teder |
| 5,574,443 | A | 11/1996 | Hsieh |
| 5,581,464 | A | 12/1996 | Woll et al. |
| 5,614,788 | A | 3/1997 | Mullins |
| 5,634,709 | A | 6/1997 | Iwama |
| 5,642,299 | A | 6/1997 | Hardin et al. |
| 5,648,835 | A | 7/1997 | Uzawa |
| 5,650,944 | A | 7/1997 | Kise |
| 5,660,454 | A | 8/1997 | Mori et al. |
| 5,661,303 | A | 8/1997 | Teder |
| 5,666,028 | A | 9/1997 | Bechtel et al. |
| 5,670,935 | A | 9/1997 | Schofield et al. |
| 5,677,851 | A | 10/1997 | Kingdon et al. |
| 5,699,044 | A | 12/1997 | Van Lente et al. |
| 5,701,366 | A | 12/1997 | Ostromoukhov et al. |
| 5,724,316 | A | 3/1998 | Brunts |
| 5,732,379 | A | 3/1998 | Eckert et al. |
| 5,737,226 | A | 4/1998 | Olson et al. |
| 5,760,828 | A | 6/1998 | Cortes |
| 5,760,931 | A | 6/1998 | Saburi et al. |
| 5,761,094 | A | 6/1998 | Olson et al. |
| 5,765,116 | A | 6/1998 | Wilson-Jones et al. |
| 5,765,118 | A | 6/1998 | Fukatani |
| 5,781,437 | A | 7/1998 | Wiemer et al. |
| 5,786,772 | A | 7/1998 | Schofield et al. |
| 5,790,403 | A | 8/1998 | Nakayama |
| 5,790,973 | A | 8/1998 | Blaker et al. |
| 5,793,308 | A | 8/1998 | Rosinski et al. |
| 5,793,420 | A | 8/1998 | Schmidt |
| 5,796,094 | A | 8/1998 | Schofield et al. |
| 5,837,994 | A | 11/1998 | Stam et al. |
| 5,844,505 | A | 12/1998 | Van Ryzin |
| 5,844,682 | A | 12/1998 | Kiyomoto et al. |
| 5,845,000 | A | 12/1998 | Breed et al. |
| 5,848,802 | A | 12/1998 | Breed et al. |
| 5,850,176 | A | 12/1998 | Kinoshita et al. |
| 5,850,254 | A | 12/1998 | Takano et al. |
| 5,867,591 | A | 2/1999 | Onda |
| 5,877,707 | A | 3/1999 | Kowalick |
| 5,877,897 | A | 3/1999 | Schofield et al. |
| 5,878,357 | A | 3/1999 | Sivashankar et al. |
| 5,878,370 | A | 3/1999 | Olson |
| 5,883,739 | A | 3/1999 | Ashihara et al. |
| 5,884,212 | A | 3/1999 | Lion |
| 5,890,021 | A | 3/1999 | Onoda |
| 5,896,085 | A | 4/1999 | Mori et al. |
| 5,899,956 | A | 5/1999 | Chan |
| 5,915,800 | A | 6/1999 | Hiwatashi et al. |
| 5,923,027 | A | 7/1999 | Stam et al. |
| 5,924,212 | A | 7/1999 | Domanski |
| 5,959,555 | A | 9/1999 | Furuta |
| 5,963,247 | A | 10/1999 | Banitt |
| 5,990,469 | A | 11/1999 | Bechtel et al. |
| 5,990,649 | A | 11/1999 | Nagao et al. |
| 6,020,704 | A | 2/2000 | Buschur |
| 6,049,171 | A | 4/2000 | Stam et al. |
| 6,066,933 | A | 5/2000 | Ponziana |
| 6,084,519 | A | 7/2000 | Coulling et al. |
| 6,097,024 | A | 8/2000 | Stam et al. |
| 6,100,799 | A | 8/2000 | Fenk |
| 6,144,022 | A | 11/2000 | Tenenbaum et al. |
| 6,175,300 | B1 | 1/2001 | Kendrick |
| 6,201,642 | B1 | 3/2001 | Bos et al. |
| 6,223,114 | B1 | 4/2001 | Boros et al. |
| 6,266,082 | B1 | 7/2001 | Yonezawa et al. |
| 6,266,442 | B1 | 7/2001 | Laumeyer et al. |
| 6,285,393 | B1 | 9/2001 | Shimoura et al. |
| 6,297,781 | B1 | 10/2001 | Turnbull et al. |
| 6,310,611 | B1 | 10/2001 | Caldwell |
| 6,317,057 | B1 | 11/2001 | Lee |
| 6,320,282 | B1 | 11/2001 | Caldwell |
| 6,333,759 | B1 | 12/2001 | Mazzilli |
| 6,353,392 | B1 | 3/2002 | Schofield et al. |
| 6,370,329 | B1 | 4/2002 | Teuchert |
| 6,392,315 | B1 | 5/2002 | Jones et al. |
| 6,396,397 | B1 | 5/2002 | Bos et al. |
| 6,411,204 | B1 | 6/2002 | Bloomfield et al. |
| 6,424,273 | B1 | 7/2002 | Gutta et al. |

(56) References Cited

U.S. PATENT DOCUMENTS

| | | |
|---|---|---|
| 6,430,303 B1 | 8/2002 | Naoi et al. |
| 6,442,465 B2 | 8/2002 | Breed et al. |
| 6,477,464 B2 | 11/2002 | McCarthy et al. |
| 6,497,503 B1 | 12/2002 | Dassanayake et al. |
| 6,498,620 B2 | 12/2002 | Schofield et al. |
| 6,534,884 B2 | 3/2003 | Marcus et al. |
| 6,539,306 B2 | 3/2003 | Turnbull |
| 6,553,130 B1 | 4/2003 | Lemelson et al. |
| 6,593,960 B1 | 7/2003 | Sugimoto et al. |
| 6,594,583 B2 | 7/2003 | Ogura et al. |
| 6,611,610 B1 | 8/2003 | Stam et al. |
| 6,636,258 B2 | 10/2003 | Strumolo |
| 6,672,731 B2 | 1/2004 | Schnell et al. |
| 6,690,268 B2 | 2/2004 | Schofield et al. |
| 6,697,109 B1* | 2/2004 | Daly ............... H04N 5/2254 348/266 |
| 6,704,621 B1 | 3/2004 | Stein et al. |
| 6,711,474 B1 | 3/2004 | Treyz et al. |
| 6,735,506 B2 | 5/2004 | Breed et al. |
| 6,744,353 B2 | 6/2004 | Sjönell |
| 6,795,221 B1 | 9/2004 | Urey |
| 6,806,452 B2 | 10/2004 | Bos et al. |
| 6,819,231 B2 | 11/2004 | Berberich et al. |
| 6,823,241 B2 | 11/2004 | Shirato et al. |
| 6,824,281 B2 | 11/2004 | Schofield et al. |
| 6,850,156 B2 | 2/2005 | Bloomfield et al. |
| 6,870,642 B2 | 3/2005 | Ostromoukhov |
| 6,889,161 B2 | 5/2005 | Winner et al. |
| 6,909,753 B2 | 6/2005 | Meehan et al. |
| 6,946,978 B2 | 9/2005 | Schofield |
| 6,975,775 B2 | 12/2005 | Rykowski et al. |
| 6,989,736 B2 | 1/2006 | Berberich et al. |
| 7,004,606 B2 | 2/2006 | Schofield |
| 7,038,577 B2 | 5/2006 | Pawlicki et al. |
| 7,054,038 B1 | 5/2006 | Ostromoulov et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,136,753 B2 | 11/2006 | Samukawa et al. |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,195,381 B2 | 3/2007 | Lynam et al. |
| 7,202,776 B2 | 4/2007 | Breed |
| 7,227,611 B2 | 6/2007 | Hull et al. |
| 7,266,248 B2 | 9/2007 | Matherson et al. |
| 7,365,769 B1 | 4/2008 | Mager |
| 7,375,803 B1 | 5/2008 | Bamji |
| 7,460,951 B2 | 12/2008 | Altan |
| 7,490,007 B2 | 2/2009 | Taylor et al. |
| 7,526,103 B2 | 4/2009 | Schofield et al. |
| 7,592,928 B2 | 9/2009 | Chinomi et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,724,962 B2 | 5/2010 | Zhu et al. |
| 7,855,755 B2 | 12/2010 | Weller et al. |
| 7,881,496 B2 | 2/2011 | Camilleri et al. |
| 7,952,490 B2 | 5/2011 | Fechner et al. |
| 8,013,780 B2 | 9/2011 | Lynam et al. |
| 8,027,029 B2 | 9/2011 | Lu et al. |
| 8,446,470 B2 | 5/2013 | Lu et al. |
| 8,849,495 B2 | 9/2014 | Chundrlik, Jr. et al. |
| 2002/0015153 A1 | 2/2002 | Downs |
| 2002/0113873 A1 | 8/2002 | Williams |
| 2003/0122847 A1* | 7/2003 | Donovan ............ G09G 3/2059 345/616 |
| 2003/0137586 A1 | 7/2003 | Lewellen |
| 2003/0222982 A1 | 12/2003 | Hamdan et al. |
| 2004/0105106 A1* | 6/2004 | Miller ................. H04N 1/6016 358/1.9 |
| 2004/0114381 A1 | 6/2004 | Salmeen et al. |
| 2006/0103727 A1 | 5/2006 | Tseng |
| 2006/0152501 A1* | 7/2006 | Furihata ............. G09G 3/3648 345/204 |
| 2006/0164221 A1 | 7/2006 | Jensen |
| 2006/0250501 A1 | 11/2006 | Widmann et al. |
| 2006/0290479 A1 | 12/2006 | Akatsuka et al. |
| 2007/0024636 A1* | 2/2007 | Lo ....................... G09G 3/2048 345/596 |
| 2007/0092244 A1 | 4/2007 | Pertsel et al. |
| 2007/0104476 A1 | 5/2007 | Yasutomi et al. |
| 2007/0201738 A1 | 8/2007 | Toda et al. |
| 2008/0095300 A1* | 4/2008 | Zingelewicz ......... G01N 23/04 378/4 |
| 2008/0147321 A1 | 6/2008 | Howard et al. |
| 2008/0231710 A1 | 9/2008 | Asari et al. |
| 2009/0093938 A1 | 4/2009 | Isaji et al. |
| 2009/0113509 A1 | 4/2009 | Tseng et al. |
| 2009/0177347 A1 | 7/2009 | Breuer et al. |
| 2009/0243824 A1 | 10/2009 | Peterson et al. |
| 2009/0244361 A1 | 10/2009 | Gebauer et al. |
| 2009/0265069 A1 | 10/2009 | Desbrunes |
| 2010/0053147 A1* | 3/2010 | Choi ................... G09G 3/2055 345/214 |
| 2010/0228437 A1 | 9/2010 | Hanzawa et al. |
| 2011/0025591 A1* | 2/2011 | Han .................... G09G 3/3406 345/102 |
| 2011/0212717 A1 | 9/2011 | Rhoads et al. |
| 2011/0285746 A1* | 11/2011 | Swic ..................... G09G 5/02 345/597 |
| 2012/0044066 A1 | 2/2012 | Mauderer et al. |
| 2012/0045112 A1 | 2/2012 | Lundblad et al. |
| 2012/0062743 A1 | 3/2012 | Lynam et al. |
| 2012/0218412 A1 | 8/2012 | Dellantoni et al. |
| 2012/0262340 A1 | 10/2012 | Hassan et al. |
| 2013/0124052 A1 | 5/2013 | Hahne |
| 2013/0129150 A1 | 5/2013 | Saito |
| 2013/0131918 A1 | 5/2013 | Hahne |
| 2014/0067206 A1 | 3/2014 | Pflug |
| 2014/0156157 A1 | 6/2014 | Johnson et al. |
| 2014/0222280 A1 | 8/2014 | Salomonsson |
| 2014/0313339 A1 | 10/2014 | Diessner et al. |
| 2014/0333729 A1 | 11/2014 | Pflug |
| 2014/0379233 A1 | 12/2014 | Chundrlik, Jr. et al. |

OTHER PUBLICATIONS

Ostromoukhov et al., "Multi-Level Colour Halftoning Algorithms" SPIE vol. 2949, Imaging Sciences and Display Technologies, Symposium on Advanced Imaging and Network Technologies, p. 332-340, 1997.

Saluja, et al., "Real Time Vehicular Camera Vision Acquisition System Using Field Programmable Gate Array (FPGA)", Paper 2013-01-1340, SAE World Congress and Exhibition Apr. 16-18, 2013, SAE International, published Apr. 8, 2013, Abstract.

International Search Report and Written Opinion dated Aug. 26, 2013 from corresponding PCT Application No. PCT/US2013/03701.

* cited by examiner

FIG. 2

| color weight | |
|---|---|
| R | 3 |
| G | 6 |
| B | 1 | color weight conversion factors

| | from | R | G | B |
|---|---|---|---|---|
| to | | | | |
| R | | 1 | 1/2 | 1/3 |
| G | | 2 | 1 | 6 |
| B | | 3 | 1/6 | 1 |

FIG. 3 used color weight conversions

| $W_{R\to G}$ | 2 |
|---|---|
| $W_{G\to B}$ | 1/6 |
| $W_{G\to B}$ | 1/3 |

FIG. 4 bit count per channel

| | 24 | 16 | 15 |
|---|---|---|---|
| R | 8 | 5 | 5 |
| G | 8 | 6 | 5 |
| B | 8 | 5 | 5 |

FIG. 5

Pixel 0

| Operation / Term | bit wise Operation / Term | reduced from -> to |
|---|---|---|
| R(0) (24 bit) | $r_1\ r_2\ r_3\ r_4\ r_5\ r_6\ r_7\ r_8$ | |
| $R_{kept}(0)$ (16 bit) | $r_1\ r_2\ r_3\ r_4\ r_5$ | 8 -> 5 |
| $R_{trans}(0)$ | $r_6\ r_7\ r_8$ | |

| | | |
|---|---|---|
| $RW = R_{trans}(0) \times W_{R \to G}$ | $r_6\ r_7\ r_8\ (\times 2) = rw_5\ rw_6\ rw_7\ rw_8$ | |

| | | |
|---|---|---|
| RW | $0\ 0\ 0\ 0\ rw_5\ rw_6\ rw_7\ rw_8$ | |
| + G(0) (24 bit) | $g_1\ g_2\ g_3\ g_4\ g_5\ g_6\ g_7\ g_8$ | |
| = $G_D(0)$ | $gd_1\ gd_2\ gd_3\ gd_4\ gd_5\ gd_6\ gd_7\ gd_8$ | |

| | | |
|---|---|---|
| $G_{kept}(0)$ (16 bit) | $gd_1\ gd_2\ gd_3\ gd_4\ gd_5\ gd_6$ | 8 -> 6 |
| $G_{trans}(0)$ | $gd_7\ gd_8$ | |

| | | |
|---|---|---|
| $GW = G_{trans}(0) \times W_{G \to B}$ | $gd_7\ gd_8\ (\times 1/6) = gw_7\ gw_8$ | |

| | | |
|---|---|---|
| GW (0) | $0\ 0\ 0\ 0\ 0\ 0\ gw_7\ gw_8$ | |
| + B (0) (24bit) | $b_1\ b_2\ b_3\ b_4\ b_5\ b_6\ b_7\ b_8$ | |
| = $B_D$ | $bd_1\ bd_2\ bd_3\ bd_4\ bd_5\ bd_6\ bd_7\ bd_8$ | |

| | | |
|---|---|---|
| $B_{kept}$ (16 bit) | $bd_1\ bd_2\ bd_3\ bd_4\ bd_5$ | 8 -> 5 |
| $B_{trans}(0)$ | $bd_6\ bd_7\ bd_8$ | |

| | | |
|---|---|---|
| $BW = B_{trans}(0) \times W_{B \to R}$ | $bd_6\ bd_7\ bd_8\ (\times 1/3) = bw_6\ bw_7\ bw_8$ | |

Pixel 1

| Operation / Term | bit wise Operation / Term |
|---|---|
| BW (0) | $0\ 0\ 0\ 0\ 0\ bw_6\ bw_7\ bw_7$ |
| + R(1) (24bit) | $r_1\ r_2\ r_3\ r_4\ r_5\ r_6\ r_7\ r_8$ |
| = $R_D(1)$ | $rd_1\ rd_2\ rd_3\ rd_4\ rd_5\ rd_6\ rd_7\ rd_8$ |

| | | |
|---|---|---|
| $R_{kept}(1)$ (16 bit) | $rd_1\ rd_2\ rd_3\ rd_4\ rd_5$ | 8 -> 5 |
| $R_{trans}(1)$ | $rd_6\ rd_7\ rd_8$ | |

| 8 bit Y-Channel coding of a YUV by dithering a 30bit source RGB (U and V remain unchanged) |
|---|
| |
| *examplary Parameters* |
| $C_y = 0.7$ |
| $W_{R(float)} = 0.299$ |
| $W_{G(float)} = 0.587$ |
| $W_{B(float)} = 0.114$ |
| $f = 4$ |
| |
| Pixel 0 |
| $Y(0)_{(12\ bit)} = int(R(0)_{(10\ bit)}*f*W_R + G(0)_{(10\ bit)}*f*W_G + B(0)_{(10\ bit)}*f*W_B)$ |
| $Y_{kept}(0)_{(8\ bit)} = Y(0)_{(12bit)}$ (8 HSB) |
| $Y_{trans}(0)_{(4\ bit)} = Y(0)_{(12bit)}$ (4 LSB) |
| $YC(0) = Y_{trans}(0) \times C_Y$ |
| |
| Pixel 1 |
| $Y(1)_{(12\ bit)} = int(R(1)_{(10\ bit)}*f*W_R + G(1)_{(10\ bit)}*f*W_G + B(1)_{(10\ bit)}*f*W_B)$ |
| $YD(1)_{(12\ bit)} = Y(1)_{(12bit)} + YC(0)_{(4\ bit)}$ |
| $YD_{kept}(1)_{(8\ bit)} = YD(1)_{(12bit)}$ (8 HSB) |
| $YD_{trans}(1)_{(4\ bit)} = YD(1)_{(12bit)}$ (4 LSB) |
| $YC(1) = YD_{trans}(1) \times C_Y$ |
| ... |
| Pixel n |
| $Y(n)_{(12\ bit)} = int(R(n)_{(10\ bit)}*f*W_R + (G(n)_{(10\ bit)}*f*W_G + B(n)_{(10\ bit)}*f*W_B)$ |
| $YD(n)_{(12\ bit)} = Y(n)_{(12bit)} + YC(n-1)_{(4\ bit)}$ |
| $YD_{kept}(n)_{(8\ bit)} = YD(1)_{(12bit)}$ (10 HSB) |

FIG. 22

VEHICLE VISION SYSTEM WITH REDUCED IMAGE COLOR DATA PROCESSING BY USE OF DITHERING

CROSS REFERENCE TO RELATED APPLICATIONS

The present application is a 371 national phase filing of PCT Application No. PCT/US2013/036701, filed Apr. 16, 2013, which claims the filing benefit of U.S. provisional applications, Ser. No. 61/680,883, filed Aug. 8, 2012, and Ser. No. 61/624,507, filed Apr. 16, 2012, which are hereby incorporated herein by reference in their entireties.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935; and/or 5,550,677, which are hereby incorporated herein by reference in their entireties.

SUMMARY OF THE INVENTION

The present invention provides a vision system or imaging system for a vehicle that utilizes one or more cameras (preferably one or more CMOS cameras) to capture image data representative of images exterior of the vehicle, and provides the communication/data signals, including camera data or captured image data, that may be displayed at a display screen that is viewable by the driver of the vehicle, such as when the driver is backing up the vehicle, and that may be processed and, responsive to such image processing, the system may detect an object at or near the vehicle and in the path of travel of the vehicle, such as when the vehicle is backing up and/or the vision system may be operable to display video images captured by one or more cameras of the vehicle and may display a surround view or bird's eye view of the environment at or around or at least partially surrounding the subject or equipped vehicle. The vision system is operable to process image data and color information, with the image data captured by the cameras reduced by a dithering algorithm running on a field programmable gate array (FPGA) of a control unit or ECU before the data is communicated or transferred to the display device.

According to an aspect of the present invention, a vision system for a vehicle includes at least one camera or image sensor disposed at a vehicle and having a field of view exterior of the vehicle, and a processor operable to process image data captured by and/or transmitted by the camera. The vision system is operable to display color video images representative of the image data captured by the camera or cameras. The vision system is operable to process captured image data to reduce the bit count or color depth of the captured images to reduce the processing requirements and communication requirements in processing the captured color images and communicating the color images (or image data thereof), such as for displaying the captured images at a color video display screen of the vehicle. The processor or algorithm may be incorporated in circuitry of the camera, or the processor or algorithm may be incorporated in circuitry of a control of the vehicle or a control (such as an Electronic Control Unit or ECU) of the vision system that is separate from the camera and camera circuitry.

According to an aspect of the present invention, a vision system for a vehicle includes a camera disposed at a vehicle and having a field of view exterior of the vehicle. The camera comprises an RGB photosensor array comprising multiple rows of photosensing elements and multiple columns of photosensing elements. An in-line dithering algorithm is applied to individual lines of photosensing elements of the photosensor array in order to reduce at least one of (i) color data transmission and (ii) color data processing. The in-line dithering algorithm comprises at least one of (i) an in-row dithering algorithm that is applied to individual rows of photosensing elements of the photosensor array and (ii) an in-column dithering algorithm that is applied to individual columns of photosensing elements of the photosensor array.

Optionally, the in-line dithering algorithm may run on a field programmable gate array, such as a pipelined field programmable gate array. The RGB photosensor array may comprise a Bayer color filter arrangement (such as an arrangement of a plurality of sets of photosensing elements that each have at least one red sensing element, at least one green sensing element and at least one blue sensing element. Optionally, in order to determine the most significant bits of the second adjusted color data, the in-line dithering algorithm may use (such as to reduce the color depth of color data captured by a photosensing element) at least one of (i) a weighing function that may be multiplied with the least significant bits of the first color data and (ii) a channel specific correction factor that may be multiplied with the least significant bits of the first color data.

Optionally, the in-line dithering algorithm may determine most significant bits and least significant bits of color data captured by a photosensing element of the photosensor array. For example, the in-line dithering algorithm may determine the most significant bits and the least significant bits of first color data captured by a first photosensing element, and the least significant bits of the first color data are added to second color data captured by a second photosensing element to generate second adjusted color data, and the in-line dithering algorithm determines the most significant bits and the least significant bits of the second adjusted color data. The most significant bits of the first color data and the second adjusted color data may be used at least in part to determine the color sensed by the respective photosensing elements.

The in-line dithering algorithm may combine the least significant bits of the second adjusted color data of the second photosensing element with color data captured by a third photosensing element of the photosensor array to generate third adjusted color data, and the in-line dithering algorithm may determine the most significant bits and least significant bits of the third adjusted color data. The most significant bits of the third adjusted color data may be used at least in part to determine the color sensed by the third photosensing element. The first, second and third photosensing elements may comprise different color sensing photosensing elements of a respective photosensing element set, or the first, second and third photosensing elements may comprise photosensing elements along the individual line of photosensing elements that are configured to sense a common color.

These and other objects, advantages, purposes and features of the present invention will become apparent upon review of the following specification in conjunction with the drawings.

BRIEF DESCRIPTION OF THE DRAWINGS

FIG. 2 is a typically used RGB color weight table based on human color conception;

FIG. 3 is a table of color weighing conversion factors when transferring one RGB color value to another color conserving the intensity;

FIG. 4 is a table of picked out RGB color weighing conversion factors (W) from FIG. 3 for further use in the error diffusion calculation schemes of FIGS. 6 and 7 (from color channel->to color channel);

FIG. 5 is a table of bit count per RGB color channel depending on bit width;

FIG. 7 is a color conserving error diffusion calculation scheme of a 24 bit RGB to 16 bit color conversion according to the scheme in FIG. 6;

FIG. 12 is an illumination conserving error diffusion calculation scheme of a 24 bit RGB to 16 bit color conversion according to the scheme in FIG. 11;

FIG. 22 shows a dithering algorithm's operations for 8 bit Y-Channel coding of a YUV by dithering a 30 bit RGB source image.

Figure 1:
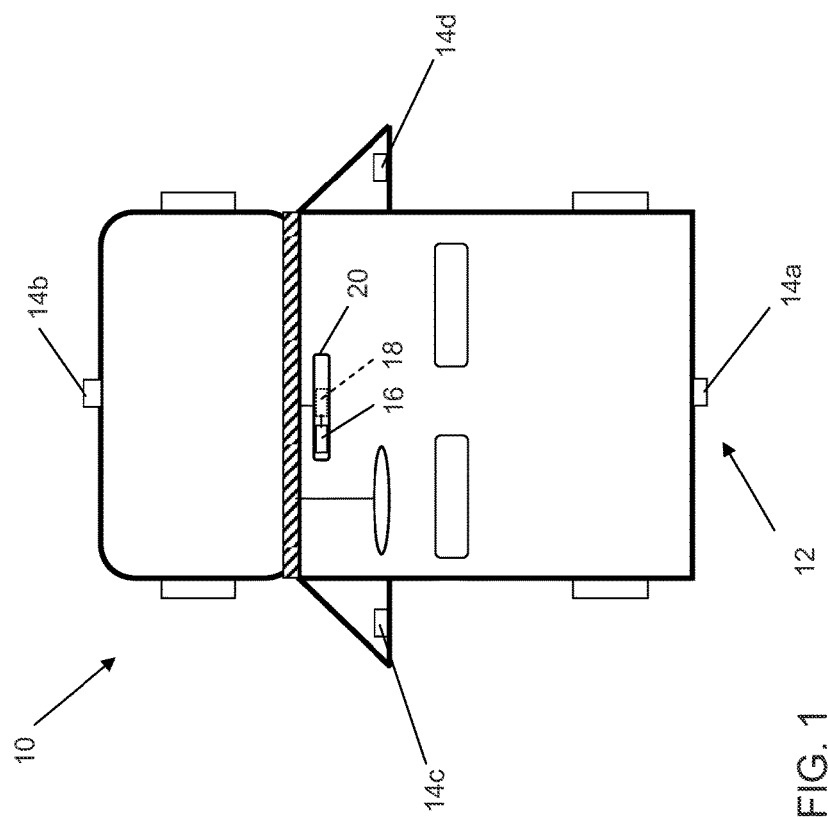
FIG. 1 is a plan view of a vehicle with a vision system and imaging sensors or cameras that provide exterior fields of view in accordance with the present invention.

LEGEND m MSB m number of Most Significant Bits
l LSB l number of Least Significant Bits
B Blue component
G Green component
R Red component
$B_5$ 5 bit blue component
$G_5$ 5 bit green component
$R_5$ 5 bit red component
R(0) Red component of originating pixel 0
$R_{kept}(0)$ (16 bit) kept high bits of red component (5 bit on red most significant bits according bits per channel) of pixel 0 used in resulting 16 bit RGB
$R_{trans}(0)$ Transferred red component least significant bits (3 on red) of pixel 0 to become color balanced (weighed) (×WR->G) and multiplied with a corrective conversion factor (Cr)
RW four bit color balanced (weighed) red component to become added to the 8 bit green component
$G_D$ 'Dithered' green component (G plus RW)
R(1) (24 bit) 8 bit Red component of originating 24 bit pixel 1 (next right to pixel 0)
$W_{R->G}$ Color weight conversion factors (here from Red to Green)
$C_R$ Corrective conversion factors for the R-channel (Red) (dampening)
$C_Y$ Corrective conversion factors of the f the Y-channel (dampening)
f factor of binary accuracy enlargement (float)
$W_R$ Fraction of Red in the illuminance channel
$W_G$ Fraction of Green in the illuminance channel
$W_B$ Fraction of Blue in the illuminance channel
Y(n) Illuminance channel value of pixel n (before dithering:= high bit resolution)
$YD_{kept}(n)$ target (diminished) bit resolution Illuminance channel value of pixel n (dithered illumination channel)
$YD_{trans}(n)$ transferred amount of LSB to illumination of right side neighboring pixel n+1

YC(n) transferred amount of YD$_{trans}$(n) after multiplying by corrective (dampening) correction factor C$_Y$ of the illuminance.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14b at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle such as at a significant distance to the ECU). The data transfer from the camera to the ECU may comprise a parallel communication (such as via a data bus or the like of the vehicle) while the data transfer from the ECU to the display may comprise a serial communication (such as via a data bus or the like of the vehicle). Optionally, the data transfer or communication between the ECU and the camera may be made via an LVDS connection or Ethernet or the like.

The camera may comprise a pixelated imaging array of photosensing elements or photosensors/pixels, with adjacent or neighboring pixels sensing respective colors or ranges of wavelengths of light. For example, the pixels of a pixel set of neighboring pixels may be associated with respective color filters that determine the color that is sensed by the pixels. For example, a red filter or blue filter or green filter or clear filter may be disposed at a respective pixel or photosensing element of a set of pixels or photosensing elements, whereby the respective pixel will sense red light or blue light or green light or white light. Although discussed below as having adjacent or neighboring red, green and blue color sensing pixels, the camera may have adjacent red and blue sensing pixels or adjacent red and cyan sensing pixels or adjacent red and clear sensing pixels or the like, depending on the particular application of the camera and vision system. The vision system includes an image processor that processes image data captured by the camera and determines the colors via processing of the light values sensed by the array of photosensing elements or pixels.

The individual photosensors of the image sensing photosensing array preferably are arranged in lines, such as rows and columns. As used herein, a line of photosensing elements comprises a linear row of photosensing elements or a linear column of photosensing elements of a photosensor array. For example, the image array sensor in an automotive camera may comprise a wide VGA imager that comprises a CMOS array (such as, for example, an MT9V024: ⅓-Inch Wide VGA Digital Image Sensor available from Aptina Imaging Corp. of San Jose, Calif., which is configured with 809 vertical lines or columns of photosensors or photosensing pixels and 499 horizontal lines or rows of photosensors or photosensing pixels (753×481 active)). Alternatively, for high definition image capture and image display, a megapixel automotive camera may be used (such as, for example, an AR0132AT: ⅓-Inch CMOS Digital Image Sensor available from Aptina Imaging Corp. of San Jose, Calif., which is configured with 1,412 columns and 1028 rows (1296×976 active)). Preferably, a Bayer pattern color filter is disposed in from of many or most or all of the photosensing pixels of the photosensing array. A Bayer filter comprises a particular arrangement of color filters is used to create a color image. The filter pattern is 50 percent green, 25 percent red and 25 percent blue and is disclosed such as in U.S. Pat. No. 3,971,065, which is hereby incorporated herein by reference in its entirety. Optionally, the system may utilize aspects of the imager and display systems and filtering aspects described in U.S. provisional application Ser. No. 61/806,674, filed Mar. 29, 2013, which is hereby incorporated herein by reference in its entirety.

The array of pixels or photosensing elements comprises horizontal lines or rows of pixels, such as red, green and blue pixels across the array. An individual photosensing pixel senses light emanating from the exterior scene as filtered by the particular color filter disposed in front that individual photosensing pixel (that in a Bayer RGB system will be one of a red spectral filter, a green spectral filter or a blue spectral filter) and sets of adjacent or local pixels output a numerical value in bits that is representative of the sensed light. For example, a set of red, green and blue sensing pixels may output a 24 bit color data value (with 8 bits coming from a red sensing pixel and forming a red channel, and with 8 bits coming from a green sensing pixel and forming a green channel and with 8 bits coming from a blue sensing pixel and forming a blue channel, and preferably with each pixel of this red/green/blue triad pixel set being physically disposed along the same or common horizontal line or row of photosensors of the imaging array), with (for example and reading from left to right along a row of pixels) bits 1-8 being associated with the red sensing pixel and forming a red channel, bits 9-16 being associated with the green sensing pixel and forming a green channel, and bits 17-24 being associated with the blue sensing pixel and forming a blue channel.

For each respective 8-bit pixel channel, bits 1-5 (for example) may be more significant/important to determine the particular color, while the other bits (bits 6-8) may be less significant/important but nevertheless may signify/determine particular specific subtle shades or hues of the respective color. Thus, a 24-bit RGB color data value or word divides into an 8-bit red channel, an 8-bit green channel and an 8-bit blue channel. Each 8-bit channel can then be demarcated/divided into Most Significant Color Channel Bits or Most Significant Bits (MSB) and Least Significant Color Channel Bits or Least Significant Bits (LSB). Conventionally, a system may truncate to the most important bits (in other words, truncate to the MSB) and (in order to reduce data transmission load/processing load) regard less or disregard/discard the less significant bits (the LSB), and independently make the same determination across the pixels of the entire imaging array.

Taking, for example, in-line dithering applied to an individual row of the multi-pixel photosensor array of the automotive camera (in other words, in-row dithering), that individual row will comprise a linear row of many hundreds of photosensing pixels. If the likes of a Bayer color filter is being used, 50 percent of the pixels may be green-filtered and 25 percent may be red-filtered and 25 percent may be blue filtered and RGBG or GRGB or RGGB color filtering may be encountered left-to-right across the row of photosensing pixels of that individual row to which the in-row dithering is being applied. If in-line dithering is being applied to an individual column (in other words, in-column dithering), that individual column will comprise a linear column of many hundreds of photosensing pixels. If the likes of a Bayer color filter is being used, 50 percent of the pixels may be green-filtered and 25 percent may be red-filtered and 25 percent may be blue filtered and RGBG or GRGB or RGGB color filtering may be encountered top-to-bottom down the column of photosensing pixels of that individual column to which the in-column dithering is being applied.

A driver of a vehicle equipped with the vision system of the present invention expects that what he or she can view exterior of the vehicle is correctly or appropriately or accurately shown/displayed/replicated at the likes of an in-dashboard or in-console video display screen associated with the vision system. Thus, for example, if the driver can observe shades of blue in the sky above the horizon in the forward field of view while driving the vehicle, the driver expects reasonable replication of those shades of blue on the video display screen. However, color, even blue color, can have a wide spectral range or spectrum of color rendition. Typically, such color rendition may require the likes of color rendition via a 24 bit color data value or word for a given set of red, green and blue sensing pixels. Transmission of and image processing of a 24 bit data value or word or the like generated by each set of the many individual pixels or photosensing elements of, for example, a megapixel photosensor array or the like, requires expansive and expensive data handling, data transmission and data processing. Thus, it is known to reduce such color data processing load by only transmitting and processing the most significant bits in the color data bit word (such as only 15 bits or 16 bits of the color data bit value or word for each pixel set of the array). The other remaining bits of the color data bit word (that typically represent subtle or slight color shades or the like) are typically disregarded for each pixel set. Thus, for example, a 24 bit color data value captured by a particular RGB pixel set of the automotive camera of the present invention may be transmitted as a 15 bit RGB color data word (such as via LVDS or via Ethernet, such as by utilizing aspects of the systems described in PCT Application No. PCT/US2012/056014, filed Sep. 19, 2012 and published Mar. 28, 2013 as International Publication No. WO 2013/043661) to an electronic control unit (ECU) located within some distance from where the transmitting camera is located for image manipulation/processing, so achieved by disregarding the least significant nine bits of the original 24-bit RGB color data value or word (such as by disregarding the least significant three bits of the color data for each of the three individual 8-bit pixel channels that make up the 24-bit RGB color data word captured at the image sensor of the automotive camera).

In computer graphics, color depth or bit depth is the number of bits used to indicate the color of a single pixel in a bit-mapped image or video frame buffer, usually quantified as bits per pixel (bpp), which specifies the number of bits used. Color depth is only one aspect of color representation, expressing how finely levels of color can be expressed (also referred to as color precision). The other aspect is how broad a range of colors can be expressed (the gamut). The definition of both color precision and gamut is accomplished with a color encoding specification which assigns a digital code value to a location in a color space. With relatively low color depth, the assigned value is typically a number representing the index into a color map or palette. Low to moderate cost color display systems typically run at 8-bit due to limited memory, whereas high-grade systems have an 18-bit (262,144 color) palette from which colors could be chosen, and with some having a 24-bit (16 million color) palette. A True Color system supports 24-bit for three RGB colors. It provides a method of representing and storing graphical-image information in an RGB color space such that a very large number of colors, shades, and hues can be displayed in an image. Typically, True Color is defined to mean at least 256 shades of red, green, and blue, for a total of at least 16,777,216 color variations. Note that the human eye can discriminate up to ten million colors. Alternately, High Color supports 15/16-bit for three RGB colors. A description of 15 bit High Color, where one of the bits of the two bytes is ignored or set aside for an alpha channel and the remaining 15 bits are split between the red, green, and blue components of the final color, can be found at http://en.wikipedia.org/wiki/High_color.

In 16-bit direct color, there can be 4 bits (16 possible levels) for each of the R, G, and B components, plus optionally 4 bits for alpha (transparency), enabling 4,096 (16×16×16) different colors with 16 levels of transparency. Also, less expensive known video displays often provide 18-bit color (64×64×64=262,144 combinations) to achieve faster color transition times, and use either dithering or frame rate control to approximate 24-bit-per-pixel true color or throw away 6 bits of color information entirely, though more expensive displays (typically IPS) can display 24-bit or greater color depth. Deep Color supports 30/36/48/64-bit for three RGB colors and is applicable for very high quality displays.

Dithering as known in the color technology arts comprises approximating a color from a mixture of at least one other color and can comprise a process that uses digital noise to smooth out colors. Dithering can assign appropriate color values from the available color palette to close-by pixels in such a way that it gives the impression of a new color tone.

A pixelated imaging array comprises a plurality of rows and columns. Each row has several red sensing pixels, several blue sensing pixels and several green sensing pixels (and several sets of adjacent or neighboring R, G and B pixels). Adjacent or neighboring RGB pixels form a set. In the case of a 15 bit color data scheme, bits 1-5 carry red information, bits 6-10 carry green information and bits 11-15 carry blue information, while in the case of a 24 bit color data scheme, bits 1-8 carry red information, bits 9-16 carry green information and bits 17-24 carry blue information, with the 24 bits divided into three individual color channels, each having 8 bits. For each individual color channel or pixel, the system looks at the respective bits to determine that color of the captured image.

In accordance with the present invention, the color data word of a given pixel set (comprising three color data channels respectively from a red sensing pixel, a green sensing pixel and a blue sensing pixel) that is transmitted to and is processed by an image processor is reduced (for example, from 24 bits to 15 or 16 bits or the like). The removed or non-processed color information (bits) from a color data word/set of a first color channel or pixel are added to the following or subsequent color data word/set of a second color channel or pixel (for example, in a given row of the photosensor array, the least significant color data bits from a red channel or red pixel encountered are added to the color data word/set of the next color channel or next color sensing pixel (such as a green sensing pixel), and the least significant color data bits from the second color channel or second pixel encountered may be added to the color data word/set of the third color channel or third pixel (such as a blue sensing pixel) encountered in that row of the photosensor array). And only after such addition to the color data word/set of the second or next color channel or pixel is the assessment made as to which of the bits of that second or next color channel are the least significant and so are to be not transmitted to the ECU or image data displaying or processing device. The least significant bits removed or ignored from the second color channel or pixel are then added to the next color channel or pixel or to the first (e.g., red) color channel or next red pixel in that row and the process is repeated. In such a manner, subtle color shade/hue information from one color channel and/or pixel is carried over to and factored into the color determination of other color channels and/or pixels, thereby the subtler shades/hues that conventionally are not rendered or reproduced in a vision system that has restricted transmission bandwidth and/or image processing, are at least partially preserved and reproduced.

The present invention thus preserves the efficiency and economy of reduced data transmission/image processing of the conventional approach, while ameliorating/reducing loss of subtle or slight shades/hues in the displayed color images. Thus, in accordance with the present invention, the color reproduction is less extreme and/or stark than what is conventionally achieved in so far that, under the present invention, subtler color shades/hues are reproduced and can be seen at the display screen by the driver of the vehicle.

Due to vehicle vision system cameras becoming more sophisticated, especially the image size and color depth or bit depth or bits per pixel becoming increased, the data busses or image processing capabilities are often at the end of their capacity. For transferring high image data rates without investing in more powerful transfer interfaces and/or transfer lines it is known to reduce the data load by either transferring just portions or fractions of the images, either using compressing algorithm (and decompressing after transferring) or by picking out areas which become transferred (such as by utilizing aspects of the systems described in PCT Application No. PCT/US2012/048110, filed Jul. 25, 2012 and published Jan. 31, 2013 as International Publication No. WO 2013/016409, which is hereby incorporated herein by reference in its entirety), or by reducing details in the images, such as by reducing the dot or pixel count or color depth. Another reason for doing a color depth reduction may be that the target device or display screen may have a lower color depth resolution as compared to the image capturing device. The compression might be lossy or loss free, depending on the used methods and user acceptance.

An acceptable lossy method is to use the YCBR format which separates the illumination from the color table. For the human eye, a shrinking of the color information while conserving of the illumination is nearly indiscernible. The image or image data may be transferred within the vehicle, typically from cameras to a processing and/or projection/display/recording unit, or from/to external (remote) sources/sinks, which may be immobile or mobile facilities or other vehicles remote from the subject or host vehicle.

In accordance with the present invention, ordered dithering (such as known in the color technology art) may be utilized whereby a threshold map is applied to pixel color data captured by pixels of the imaging array of the automotive camera, causing some of the pixels to be rendered at a different color and causing the pixel's value to be effected if it exceeds the threshold. Also, one-dimensional error diffusion, two-dimensional error diffusion and/or gamma correction, such as known in the color technology art, can be used. Aspects of the Floyd and Steinberg error diffusion (E-D) algorithm (such as disclosed in R. W. Floyd and L. Steinberg; "An adaptive algorithm for spatial grey scale"; Proc. Soc. Inf. Display, 17:75-77, 1976 (which is hereby incorporated herein by reference in its entirety) may be beneficially used. Also, halftone techniques, such a digital halftoning, can be used. Prior art multi-level color halftoning algorithms are disclosed by Victor Ostromoukhov et al. in "Multi-Level Colour Halftoning Algorithms" SPIE Vol. 2949, *Imaging Sciences and Display Technologies, Symposium on Advanced Imaging and Network Technologies*, p. 332-340, 1997 (which is hereby incorporated herein by reference in its entirety). A prior art error-diffusion algorithm is disclosed by Victor Ostromoukhov of the Univ. of Montreal in "A Simple and Efficient Error-Diffusion Algorithm", Proceedings of SIGGRAPH 2001, in *ACM Computer Graphics*, Annual Conference Series, pp. 567-572, 2001 (which is hereby incorporated herein by reference in its entirety). Halftoning with gradient-based selection of dither matrices is disclosed in U.S. Pat. No. 5,701,366, which is hereby incorporated herein by reference in its entirety. Halftoning by enhanced error diffusion is disclosed in U.S. Pat. No. 6,870,642, which is hereby incorporated herein by reference in its entirety. Generation of digital halftone images by multi-color dithering is disclosed in U.S. Pat. No. 7,054,038, which is hereby incorporated herein by reference in its entirety.

Figure 8:
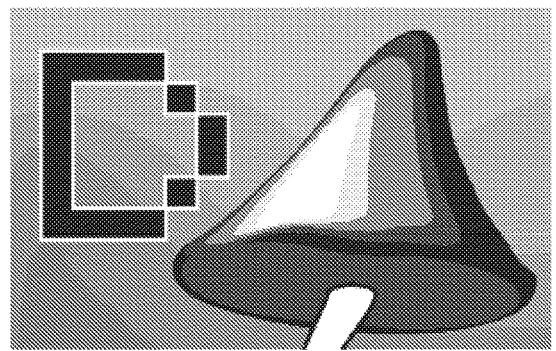
FIG. 8 is an example of typical color banding caused by just deleting the least significant bits when converting a high color room image into a lower color room image, shown zoomed for pointing out differences and shown as converted to gray scale.

The present invention provides efficiency and economy when reducing the captured images' color depth by removing the lowest significant bits (LSB), such as by cutting or removing as few bits as needed for reducing the data size, without resulting in smoothing leading to color bandings, which, in some cases, may be disturbing to the users eye (see FIG. 8). But in accordance with the present invention, color information that is removed from data captured at one pixel (or pixel set) is added to or blended with the color data captured by another pixel (or another pixel set) of the array and only after this addition is made, the determination and consequent removal of the lowest significant bits of that second or other pixel (or that other pixel set) is made. Thus, subtle or less significant color information from a given pixel, though discarded when transmitting that given pixel's color data across a communication bus or cable of the vehicle, is nevertheless used when determining the color data of the next or close-by pixel encountered, and so the subtle color data of that given pixel is not entirely lost but rather, blends or bleeds into the color determination made at other pixels of the array.

The inventive method and system of the present invention thus provides a system that copes with color banding while reducing the color depth in an effective manner (for data size reduction in automotive image transfer).

Figure 20:
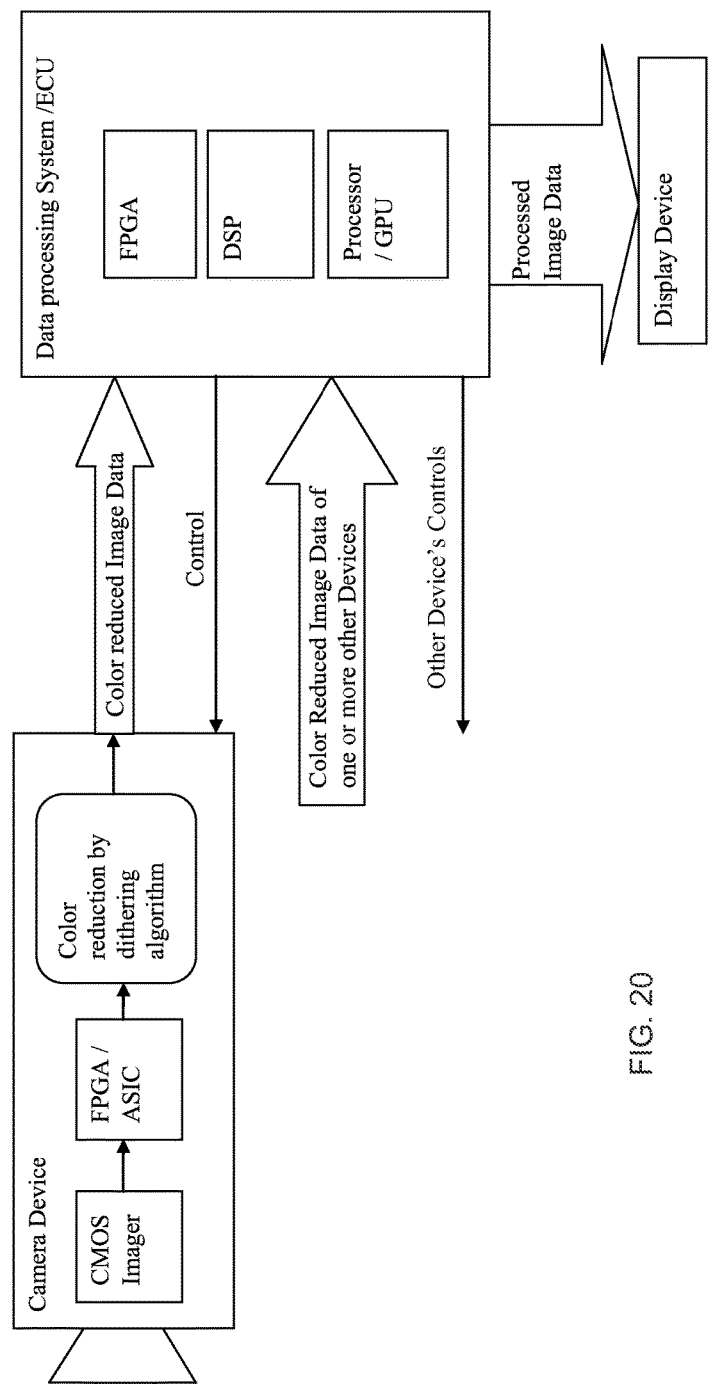
FIG. 20 is a schematic of a vision system with one or more cameras, which provide reduced color depth image data to an ECU, with the image data captured by the cameras reduced by the dithering algorithm running on the FPGA or ASIC of the camera.
Figure 21:
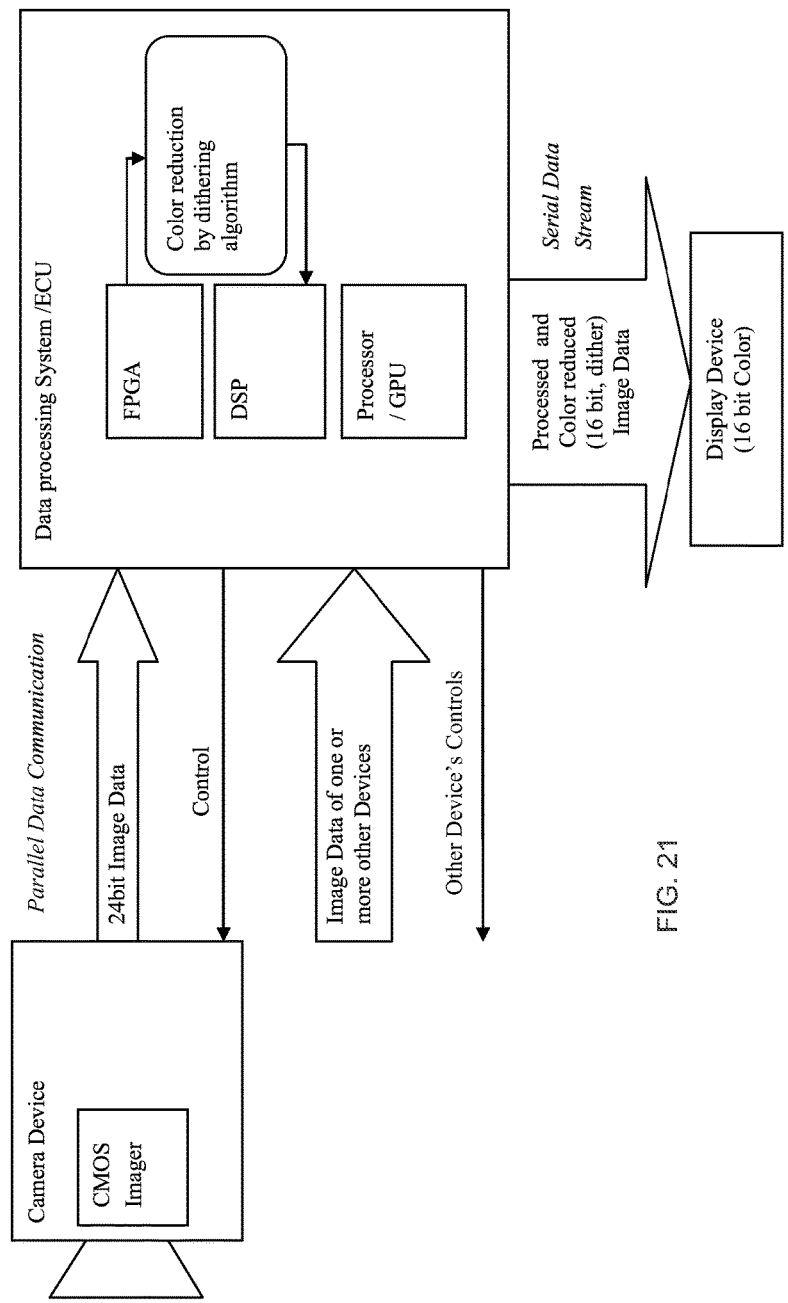
FIG. 21 is a schematic of a vision system with one or more cameras, which provide full color depth (24 bit RGB) image data to an ECU, with the image data captured by the cameras reduced (16 bit RGB) by the dithering algorithm running on the FPGA of the ECU before being transferred to the display device.

One aspect of the present invention is the use of an 'error diffusion' or color diffusion algorithm (typically 'error diffusion' algorithms influence the neighboring pixels of a pixel that is being processed). There is typically a processing direction, such as, for example, row or line wise from left to right and column or line wise from top to bottom. Conventionally, often the pixels next in the processing direction and in the next following or adjacent row/line are used for conventional dithering pixel value calculations. This requires the storing of carry values of the next line (by processors). Thus, more than one row (or more than one column) of image data need be simultaneously transmitted and/or processed, and this need to process transmit/process more than one row (or column) at the same time places a load on the transmission path bandwidth and/or the processing power/capacity/memory/circuitry used. The conventional need to simultaneously handle more than a single row (or column) when executing dithering is particularly ineffective to accomplish in field-programmable gate arrays (FPGAs). There is a desire to use FPGAs for the image compression both for economy and since the FPGA capacity is typically already present in vision systems' automotive cameras, and the processor's capacity is always important both for cost and performance (see FIGS. 20 and 21). The use of FPGAs in automotive vision systems is known, such as is described in "Real Time Vehicular Camera Vision Acquisition System Using Field Programmable Gate Array (FPGA)" by Saluja et al., Paper 2013-01-1340, published Apr. 8, 2013, SAE World Congress and Exhibition Apr. 16-18, 2013, SAE International (which is hereby incorporated herein by reference in its entirety).

In accordance with the present invention, the innovative in-row dithering algorithm operates to reduce data transmission load and reduce image processing/image display load by applying the above described dithering to pixels present in an individual single row of a multi-row (typically at least 300 rows) automotive color video camera and the in-row dithering algorithm applies and executes its color data value/word reductions on those pixels of that single individual row and does so independent of and agnostic of any other pixels of the photosensor array. Thus, the in-row dithering algorithm does not need to utilize or process any pixel from any other row or multiple rows adjacent to or local to the subject single individual row the in-row dithering algorithm processes. Thus, the dithering is accomplished in-row and not across more than one row. In a multi-row single frame of image data, the control or ECU can apply the in-row dithering algorithm to each single row of photosensing pixels from top to bottom of that frame, and then move to the next frame to repeat.

Likewise, and in accordance with the present invention, the innovative in-column dithering algorithm operates to reduce data transmission load and reduce image processing/image display load by applying the above described dithering to pixels present in an individual single column of a multi-column (typically at least 300 columns) automotive color video camera and the in-column dithering algorithm applies and executes its color data value/word reductions on those pixels of that single individual column and does so independent of and agnostic of any other pixels of the photosensor array. Thus, the in-column dithering algorithm does not need to utilize or process any pixel from any other column or multiple columns adjacent to or local to the subject single individual column the in-column dithering algorithm processes. Thus, the dithering is accomplished in-column and not across more than one column. In a multi-column single frame of image data, the control or ECU can apply the in-column dithering algorithm to each single column of photosensing pixels from left to right of that frame, and then move to the next frame to repeat.

The dithering (error diffusion or color diffusion) algorithm of the present invention provides the desired processing without the need of storing the next line's carry data, which makes the algorithm FPGA capable, as discussed below. Alternatively to a FPGA, an ASIC may be used, particularly when producing high volumes of identical implementations. Optionally, a DSP can be used. The control or processor that does the dithering (or that comprises and executes the dithering algorithm) may reside at the camera itself or may reside at or near the control unit or ECU (whereupon color data transmitted from the ECU to the likes of a display device of the vehicle can be reduced from, for example, a 24-bit color data value or word to a 15-bit color data value or word to better suit the color display capability of the display device).

Many conventional automotive vision systems utilize digital signal processors (DSP) that comprise signal processing using microprocessors specifically designed for the signal-processing applications. DSPs typically comprise one or more arithmetic-logic units (ALUs) capable of basic arithmetic and logic functions including multiply-accumulates (MACS), an instruction decoder and some data path logic to move data between the ALU and memory. Instructions usually are sequentially fetched from a programmable instruction store and decoded to control the function of the ALU and the flow of data between the ALU and the data store. Complex algorithms are implemented by stringing together a sequence of these instructions to manipulate the data in the desired way. This general-purpose structure allows the programmed instruction sequence, rather than the hardware architecture, to define the function. The result is a generic processor that can be mass-produced to fit a large variety of applications. While these DSP microprocessors have special features to reduce control overhead and improve throughput for heavily arithmetic applications, they still process the data using a serial instruction stream. The data throughput is limited by the complexity of the algorithm and the instruction cycle time of the processor. Signal-processing applications (and especially in real-time image data processing encountered with the automotive vision systems of the present invention) typically require tens or even hundreds of instructions per data sample, so even with DSP microprocessors running at 200 MHz or more, the maximum data sample rate per processor is usually less than 10 megasamples/second.

As disclosed and discussed above, the in-row dithering (or in-column dithering) of the present invention particularly suits use of a pipelined field programmable gate array (FPGA). Like microprocessors, FPGAs are mass-produced generic parts customized to a particular application by a program loaded by the end user. However, rather than a set of sequential instructions, an FPGA program is a long string of static bits that control the function of hundreds or thousands of small logic blocks and those blocks' interconnections. The logic blocks are typically four-input binary lookup tables, usually with a capability for adding a flip-flop to the table output. The FPGA program sets the table values for each table, which in turn determines the Boolean function of that logic block. Use of an FPGA allows that the algorithm being processed be unrolled so that each part of the process is done by dedicated hardware arranged in a pipeline, much like an assembly line. This yields several benefits including that, since each part of the pipeline performs only one task and then passes the result to the next function in the chain, there is reduced waiting for hardware availability. A new sample can be processed as soon as the previous partial result is passed to the next pipeline stage, generally on every clock cycle regardless of the complexity of the algorithm. Furthermore, since each stage in the pipeline is dedicated to a particular task, it can be optimized specifically for that task without need to include the extra logic that would be required to control functionality in a general-purpose design. Also, the custom logic is not necessarily bound to a particular data word width.

The ability in an FPGA to define the function at the gate level rather than with the higher-level primitives represented by microprocessor instructions often reduces the logic even further. This hardware customization leads to greatly simplified logic, which in turn reduces the propagation delays and lowers the power consumption. Also, the output of each pipeline stage usually connects only to the input of the next stage, not only eliminating shared data buses, control and storage, but also reducing the length and fanout of the connections between stages. Use of a pipelined FPGA in conjunction with the in-row dithering (or in-column dithering) of the color data captured by an automotive camera in accordance with the present invention has many advantages that flow from the in-row (or in-column) dithering being performed on one and only one row (or column) of the photosensor array at any time so that the pipelined FPGA can optimally process the dithered color data.

Figure 9:
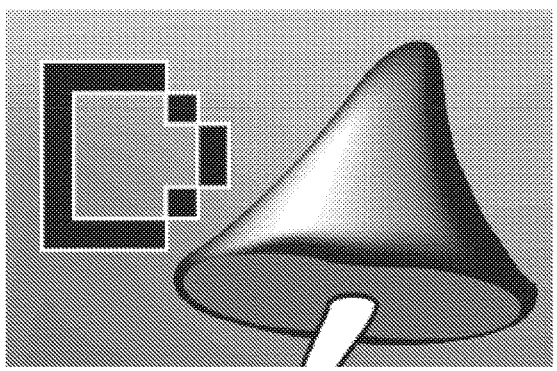
FIG. 9 is a source image of FIG. 8 with 24 bit color depth, shown zoomed for pointing out differences and shown as converted to gray scale.
Figure 10:
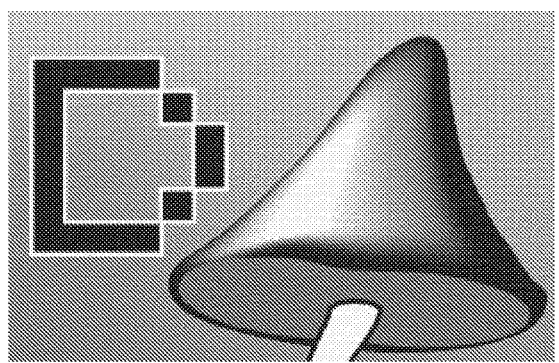
FIG. 10 is another image similar to FIGS. 8 and 9, with a color depth reduced image obtained by using a color conserving error diffusion algorithm in accordance with the present invention, shown zoomed for pointing out differences and shown as converted to gray scale, with the dithered result still pleasing compared to the original considering this is a zoomed example which amplifies the dither dot size.

To cope with color banding while reducing the color depth of images in an effective manner, the system or method of the present invention may use half toning methods known from the printing branch. Colors and gray tones may be generated by mapping color and/or gray dither or noise out of a reduced (or mono) color palette upon each other composing the desired color or gray tone or tones. The more dense or bigger the dither dots are then the stronger the color tone appears or the darker the gray tone appears. The dither dot size determines the distance from which the dither pattern becomes invisible or not readily discernible, but becomes perceived as a surface with certain color and brightness or gray tone (compare FIGS. 8 and 9). In a digital image display, the display dot size is the lower limit of dither dot sizing.

It is conventionally known that 'ordered dithering' typically does not achieve good results, due to pseudo structure or pattern generation. Better results can be achieved by using 'color-' or 'error-' diffusion dithers (such as the error between the original or brightness value and the quantized value of each pixel).

The present invention uses an error or color diffusion algorithm in automotive vision systems to reduce the transmission/process workload for image data captured by and being transmitted from an automotive camera of the equipped vehicle. The system may use a known error diffusion algorithm in combination with an automotive vision system's color reduction, especially for color reduction within automotive cameras before data transfer. Such known algorithms include Floyd-Steinberg, "false" Floyd-Steinberg, Shiau-Fan, Ostromoukhov, 'Jarvis, Judice, and Ninke', Stucki, Burkes, Sierra2, Sierra-2-4A Sierra3, Sierra Lite, Stevenson-Arce, Atkinson (used in HyperDither). The known error diffusion algorithms have in common that they influence pixels (and use) not only from the current row/line but also those of the next following row/line or rows/lines above for calculating the dithering pixel values. As mentioned above, this is ineffective to accomplish in FPGAs.

The present invention uses an error or color diffusion algorithm in automotive driver assistant and vision systems that is limited to the currently processed line (such as an independent or individual row of pixels or column of pixels of the pixelated imaging array), in order to enable the processing on FPGAs. The present invention also uses the color diffusion algorithm as a camera control function within the camera or the control device that processes captured camera images. By executing the color diffusion algorithm, the color depths (such as the amount of used bits) of the target image are reduced compared to the source image color depths.

The input image may come in any color space, preferably, but not exclusively, in a YCBR, YUV, $Y'C_BC_R$, $Y_oC_G$ or HSL format or in RGB. The error or color diffusion may be done in a weighted manner aiming to conserve the color tones. The entries in mapping tables in FIGS. 2-4 are common examples of typical color weighing in the RGB color room.

The error or color diffusion algorithm of the present invention may use corrective conversion factors, preferably between 0 and 1, and typically less than 1, and typically chosen between approximately 0.6 and approximately 0.8, to dampen the color value (the remaining least significant bits (LSB), respectively the 'error') that was transferred from the earlier calculated color and/or pixel. Optionally, the algorithm's divisions and/or multiplications may be mapped as look up tables and/or sufficient approximated polygon's coefficients or spline coefficients preferable (for use in FPGAs) shift operations, masking, summation and subtraction.

The present error or color diffusion algorithm may place emphasis in either more light intensity conserving (less noise in illumination, more color noise) or more color intensity conserving (less noise in color intensity, more illumination noise). At the more light intensity conserving algorithm, the single pixel color values interfere to each other but not at the more color intensity conserving algorithm.

Figure 6:
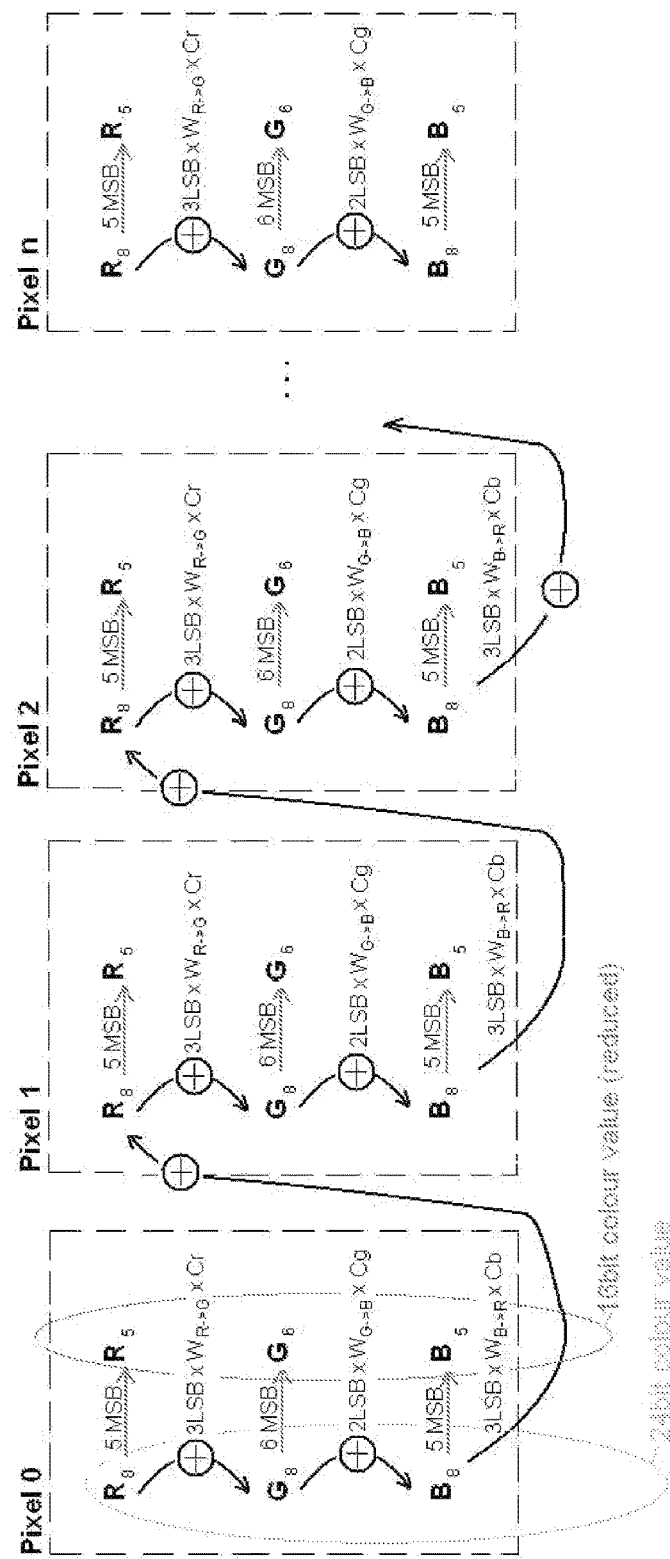
FIG. 6 is a color conserving error diffusion calculation scheme of a 24 bit RGB to 16 bit color conversion in accordance with the present invention.

As illustrated in FIGS. 6 and 7, the algorithm may work line-wise/row-wise from left to right. Alternately, the algorithm may work column-wise but merely requiring computation of color data from pixels located along the one and same column (and not requiring color pixel data from adjacent or other columns). Because the algorithm's operation is limited to one line or row (or column) of pixels, several lines or blocks may be (dithering-) processed independently at the same time or at different times (or as conventionally or conveniently sequential). When processing by a FPGA, there may be the option to use more than one independent pipeline to color reduce an image.

Every color component may be reduced by a certain number depending on which bit number the source and the resulting RGB image is from. FIGS. 6 and 7 show an example of processing one line or row starting with the left pixel set (comprising a red sensing pixel, a green sensing pixel and a blue sensing pixel) of the more light intensity conserving method. In this example, red comes before green, which comes before blue. The order in which the color channels are processed can be chosen different from the shown example when regarding the amount of resulting bits of a color according to FIG. 5, which leads to differing amounts of Most Significant Bits (MSBs) and transferred Least Significant Bits (LSBs) and different color weight conversion factors $W_{source\ color \to target\ color}$ (see tables of FIGS. 2, 3 and 4).

The transfer is preferably always the amount of LSBs that is the difference between the originating bit number of one color channel and the number of bits of that color channel of the resulting (target), reduced image. There is a weighing factor and color specific correction factor which are multiplied with the transfer bits of the parent channel. The result of that is added to the successive color channel's originating value which then is again subject to become split into MSBs, which are carried over to the resulting color value, and LSBs, which are weighed, corrected and added to the successive color. When all of the colors or pixels of a pixel set are processed, the last color's LSB value is weighed, corrected and added to the first color or pixel of the next pixel set.

In the example of a color conserving algorithm as shown in FIGS. 6 and 7, blue (the last color of red, green and blue that is processed for a given pixel set) always influences the color value of the red channel (the first color processed in the next pixel set) in the pixel set at the right of the previous pixel set. This goes on onto the end of the line or row (or column when processing column wise) of the imaging array. The LSB of the blue channel at the last pixel set of the line may be dropped. Since there is always a loss by that dropping (in the probability of about 3/2 bit) over each line, that loss may be respected within the correction values 'C' (but that influence is sufficiently small that it may be ignored). The more important role of factor 'C' is to dampen the dragging of (LSB-) carry values which become transferred to consecutive pixels (at the right when processing along a row) of areas of even color for suppressing producing artifacts at the end of the area of even color. Typically, 'C' becomes chosen as a fraction of 1, typically between approximately 0.6 and approximately 0.8 (such as, for example, approximately 0.7), the smaller 'C' becomes chosen the stronger the dampening turns out. Further advanced algorithms may employ a filter or transfer function (such as a non linear function, evtl. discontinuous) instead of a fixed factor 'C' (linear function) for achieving advanced dithering results. When one line is done the next line is processed without the influence from the one above (when computing or processing sequentially).

FIG. 6 shows an error diffusion calculation scheme of a 24 bit RGB to 16 bit color conversion in accordance with the present invention (more light intensity conserving method). The algorithm follows the arrows shown in FIG. 6. Pixel set 0 is the start or first pixel set, typically the first pixel set in a row of pixels. Pixel set 1 is the pixel set next right to the start pixel set in the same row. Pixel set n is the last pixel set, typically the last in a row, receiving a blue component from pixel set (n−1), not shown in FIG. 6. In FIG. 6, the 'W's are conversion factors from FIG. 4 and the 'C's are not closed defined corrective conversion factors. The three LSBs of the blue component of the last pixel set n are dropped.

Examples on used terms: 5 MSB=the five Most Significant Bits; 3 LSB=the three Least Significant Bits; $W_{B \to R}$=weighing conversion factor Blue to Red; Cr=correction factor for the red component; and $G_8 \to G_6$=conversion of a true color (8 bit) RGB green value to a 16 bit RGB green value (6 bit).

FIG. 7 shows an error diffusion calculation scheme of a 24 bit RGB to 16 bit color conversion according to the scheme of FIG. 6 (more light intensity conserving method). The middle rows show the operation of the left row broken down into bits using the weighing table from FIG. 4. In FIG. 7, the areas with the gray background are the resulting pixel color channel values. The multiplications are not shown in detail, and optionally these may use look up table contents and/or sufficient approximated polygon's coefficients or spline coefficients or preferable (for use in FPGAs) shift operations, masking, summation and subtraction. The leading bit of the MSB is marked as 1 and the least significant bit has the highest number (5, 6 or 8, respectively).

Figure 11:
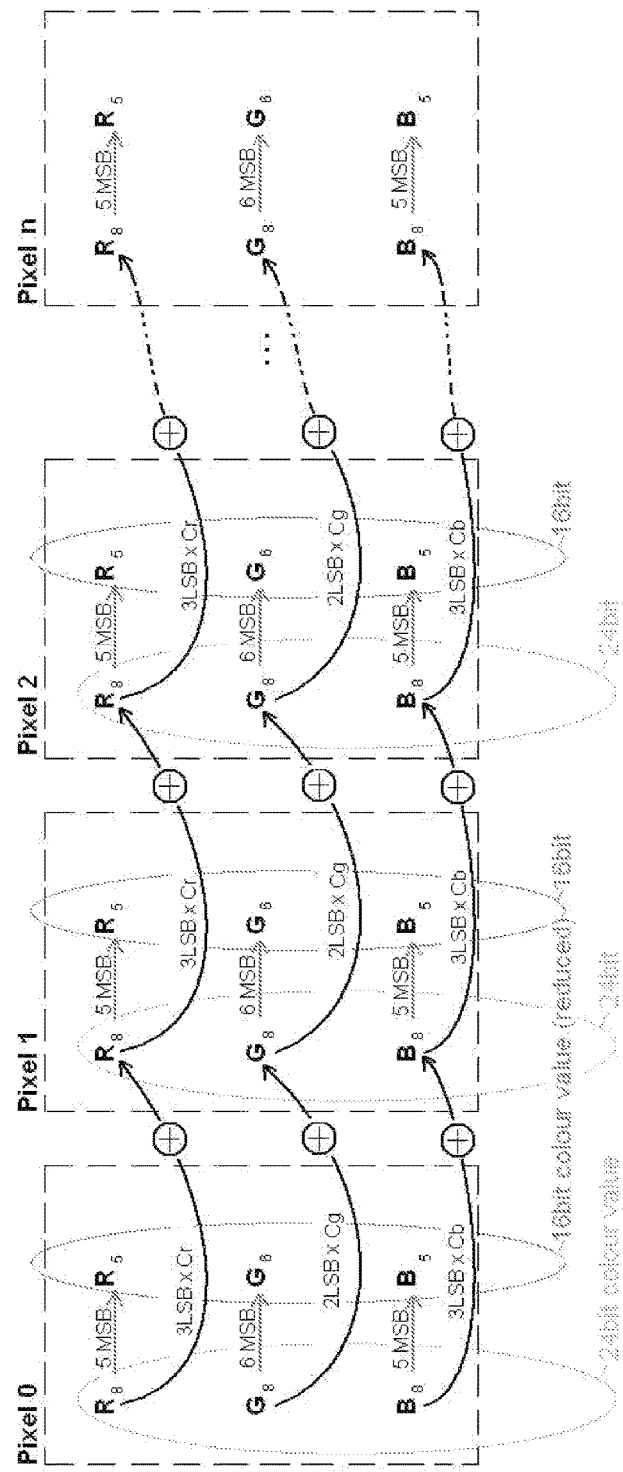
FIG. 11 is an illumination conserving error diffusion calculation scheme of a 24 bit RGB to 16 bit color conversion in accordance with the present invention.
Figure 12:
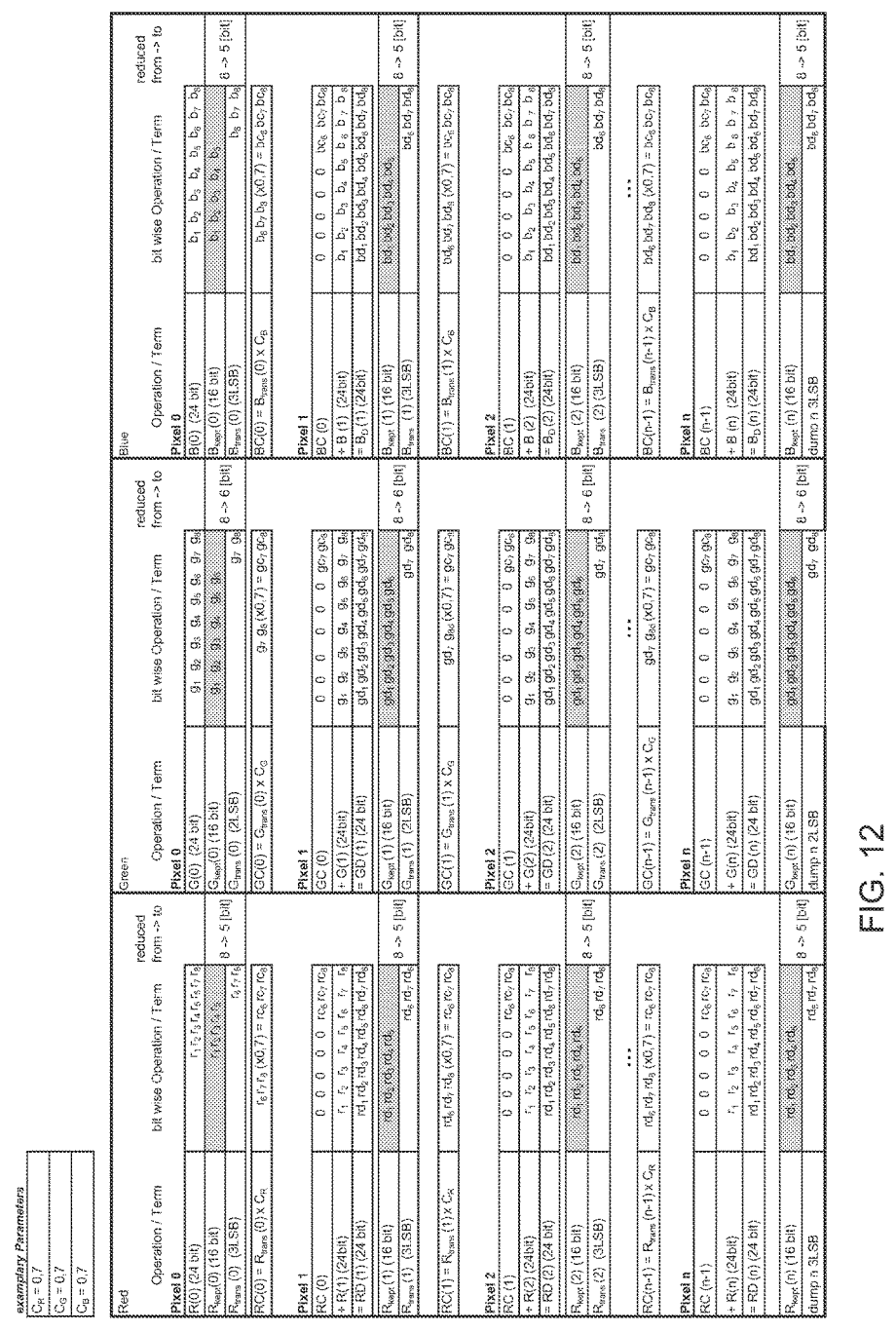
Figure 13:
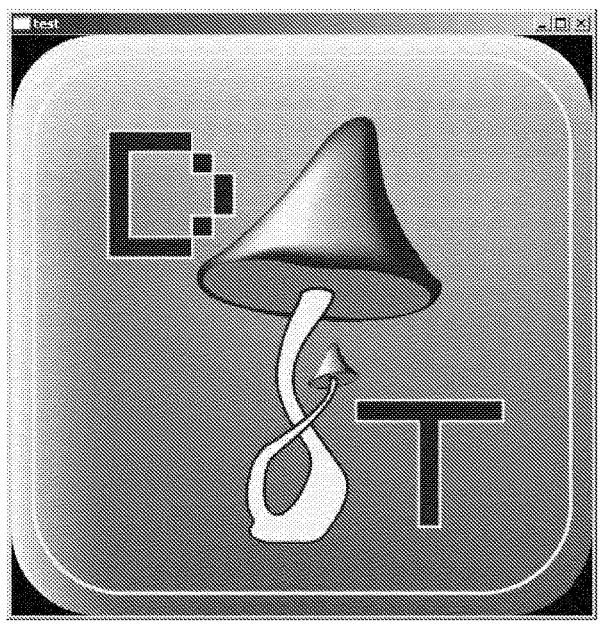
FIG. 13 is another image similar to FIGS. 8 and 9, with a color depth reduced image obtained by using an illumination conserving error diffusion algorithm in accordance with the present invention shown as converted to gray scale, with the dithered result still pleasing compared to the original (see FIG. 16)
Figure 14:
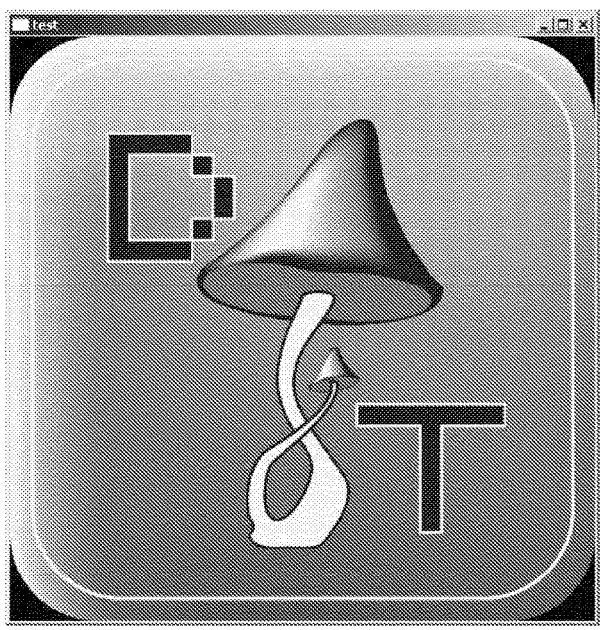
FIG. 14 is another image similar to FIG. 13, with a color depth reduced image obtained by using a color conserving error diffusion algorithm in accordance with the present invention, shown as converted to gray scale, with FIG. 10 being a cut out region of FIG. 14.
Figure 15:
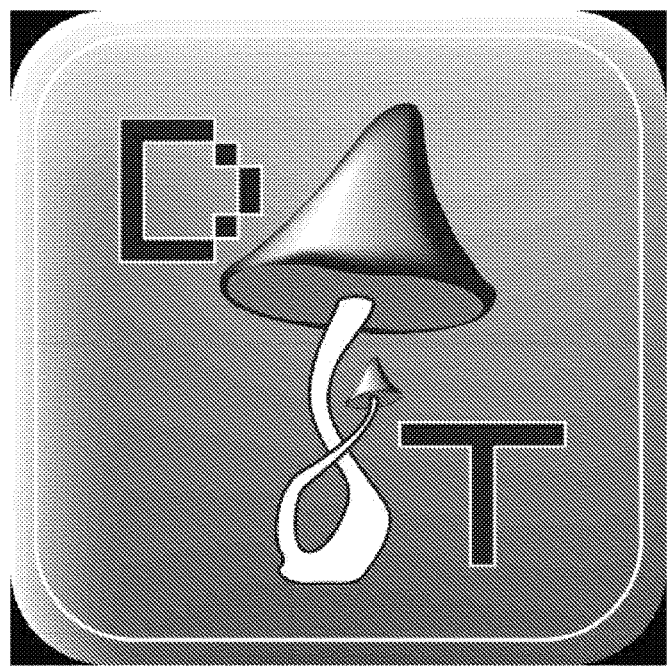
FIG. 15 is another image similar to FIGS. 13 and 14, with a color depth reduced image obtained by equally weighted blending of both an image obtained by a color conserving error diffusion algorithm (see FIG. 14) and an image obtained by a illumination conserving error diffusion algorithm (see FIG. 13) in accordance with the present invention, shown as converted to gray scale, achieving a good compromise close to the original (see FIG. 16)
Figure 16:
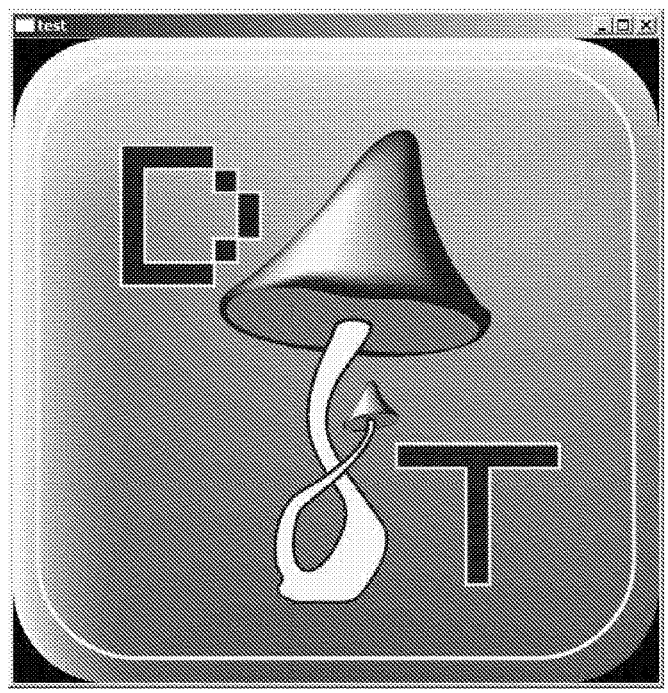
FIG. 16 is a source image of FIG. 8 with 24 bit color depth, shown as converted to gray scale, with FIGS. 9 and 17 being cut out regions of FIG. 16.
Figure 17:
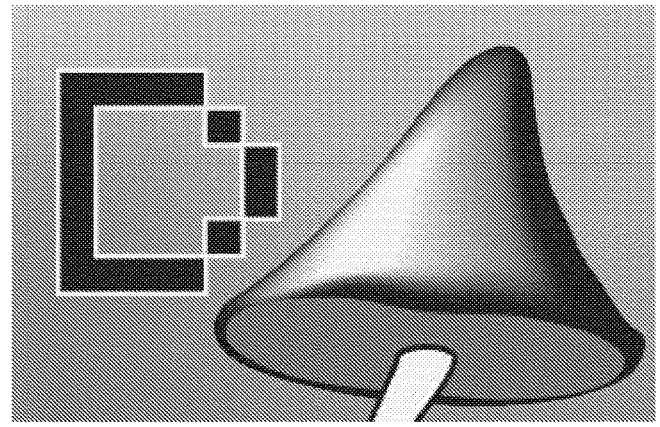
FIG. 17 is identical to FIG. 9 and is a source image of FIG. 8 with 24 bit color depth, shown zoomed for pointing out differences and shown as converted to gray scale.
Figure 18:
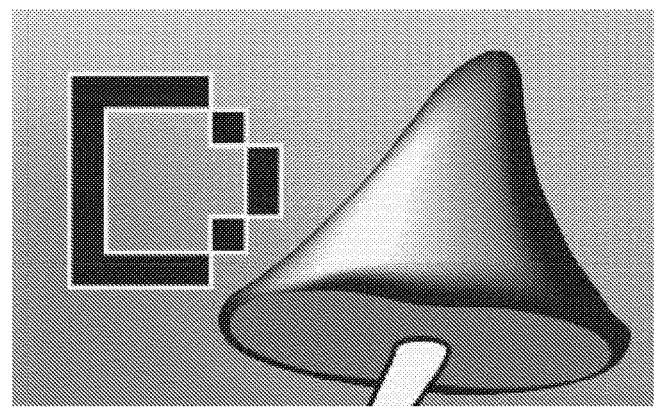
FIG. 18 is a cut out image from FIG. 13 similar to FIGS. 8, 9 and 17, with the illumination conserving dithering depth reduced.
Figure 19:
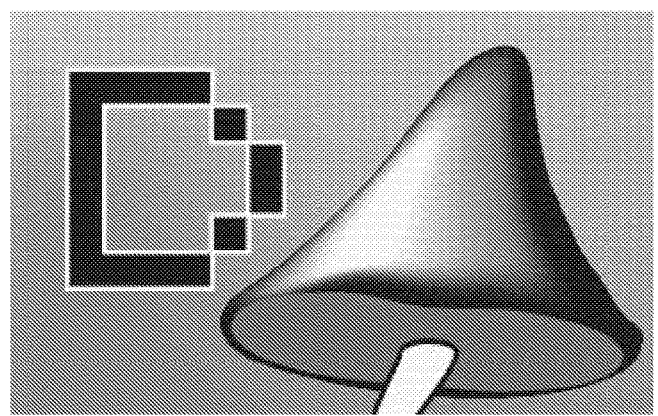
FIG. 19 is a cut out region of FIG. 15 which is a blending of illumination- and color conserving dithering.

A more color conserving variant of the suggested algorithm according to the present invention is shown in FIGS. 11 and 12. As shown in FIG. 11, the least significant bits (LSB) of the value of a color are added to the source image's value of the same color (never to a different color such as shown in the example of FIGS. 6 and 7). The three least significant bits for red of one pixel or pixel set are added to the red component of next right neighboring pixel or pixel set, then the five most significant bits are kept for the resulting image and again the three least significant bits added (transferred) to the next right neighboring pixel or pixel set. There are no 'W' factors since there are no color value conversions to do. The 'C' factors are still in use for dampening the dragging of (LSB-) carry values over areas with even colors. The dampening may be chosen between 0 and 1, typically in a region between approximately 0.6 and approximately 0.8.

FIG. 12 shows an error or color diffusion calculation scheme of a 24 bit RGB to 16 bit color conversion according to the scheme of FIG. 11 (more color conserving method). The middle row of each box shows the operation of the left row broken down into bits using the exemplary corrective conversion factor table at the top (for each color, all the same 0.7 within this example). The areas with the gray background are the resulting pixel color channel values. The multiplications are not shown in detail, and optionally these may use look up table contents and/or sufficient approximated polygon's coefficients or spline coefficients or preferably (for use in FPGAs) shift operations.

This may be done by executing both the color conserving and the illumination conserving algorithm (preferably at the same time for each pixel) and blending the results preferably but not exclusively equally weighted to each other.

When using the inventive algorithm within the YCbCr (with Y representing the illuminance) color room, the error or color diffusion dithering algorithm according to the present invention may be used for dithering the Y channel only, while Cb and Cr may remain unchanged. The more color conserving or the more lighting conserving variant may come into use or both in combination. Especially high dynamic range cameras may benefit by using this inventive algorithm since it's high resolution Y bit channel often have to be compressed anyway before further use (such as, for example, 20 bit to 14 bit) in image transfer systems.

FIG. 22 shows a dithering algorithm's operations for 8 bit Y-Channel coding of a YUV by dithering a 30 bit RGB source image (exemplary one (any) line). This Y-coding algorithm may work also when using different color rooms with Y cannels such as like $YC_oC_G$. According to the chosen coding, the color weighting factors $W_{R/G/B}$ (float) to the Y-channel may be chosen accordingly. The $YC_oC_G$ coding is designed to have the advantage to possess finite color transition factors from RGB when expressing these binary or hexadecimal. Conventional YUV, such as YCbCr or the like, may have infinite remainings in the binary (or hexadecimal) system when generating the Y, Cb and Cr components from RGB. By a (binary) multiplication (shift left operation), the remainings are dragged to >1, which preserves these from truncation when converting the float value into integers (int(remain expressed in floating point number)). A factor f of four is sufficient for $YC_oC_G$, while higher factors (f>2) may be necessary to capture the remaining sufficiently in other YUV codings such as YCbCr. The remaining bits may be truncated or averaged when converting a RGB to any YUV code, and with the algorithm of the present invention, just the fractions of the remaining bits that are less than 1 after factorization may be truncated (by turning the float into integer).

When using the inventive algorithm, the images over all illumination can be widely preserved, by adding the remaining number of LSB of one RGB pixel's Y result ($Y_{trans}$ or YC when using a $C_Y$ as referred below) to the right neighbor pixel's Y channel, each line or row independently. The chosen number of MSB may be stored in the according pixel's Y channel ($Y_{kept}$). Optionally, a dampening $C_Y$ may come into use for eliminating the drag of a remaining on illumination constant image patches. By that an 8 bit Y channel may carry the light intensity information of about a 9 bit (also visible at 8 bit display devices) without additional bandwidth.

Therefore, the present invention provides an algorithm or image processing scheme that processes the camera pixels and image data captured by the vehicle camera, and reduces the color depth in a manner that enables and enhances the processing on FPGAs. The present invention also uses the error or color diffusion algorithm as a camera control function within the camera or the control device that processes captured camera images. Thus, the algorithm or processor of the present invention is operable to use an error or color diffusion algorithm that processes a line or row (or column) of pixels of the imaging array independently from other lines of pixels of the imaging array, in order to reduce processing and memory requirements of the system and thus to enable the processing on FPGAs.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in PCT Application No. PCT/US2012/066570, filed Nov. 27, 2012, and/or PCT Application No. PCT/US2012/066571, filed Nov. 27, 2012, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, an array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data. For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or PCT Application No. PCT/US2010/047256, filed Aug. 31, 2010 and published Mar. 10, 2011 as International Publication No. WO 2011/028686 and/or International Publication No. WO 2010/099416, published Sep. 2, 2010, and/or PCT Application No. PCT/US10/25545, filed Feb. 26, 2010 and published Sep. 2, 2010 as International Publication No. WO 2010/099416, and/or PCT Application No. PCT/US2012/048800, filed Jul. 30, 2012, and/or PCT Application No. PCT/US2012/048110, filed Jul. 25, 2012, and/or PCT Application No. PCT/CA2012/000378, filed Apr. 25, 2012, and/or PCT Application No. PCT/US2012/056014, filed Sep. 19, 2012 and published Mar. 28, 2013 as International Publication No. WO 2013/043661, and/or PCT Application No. PCT/US12/57007, filed Sep. 25, 2012, and/or PCT Application No. PCT/US2012/061548, filed Oct. 24, 2012, and/or PCT Application No. PCT/US2012/062906, filed Nov. 1, 2012, and/or PCT Application No. PCT/US2012/063520, filed Nov. 5, 2012, and/or PCT Application No. PCT/US2012/064980, filed Nov. 14, 2012, and/or PCT Application No. PCT/US2012/066570, filed Nov. 27, 2012, and/or PCT Application No. PCT/US2012/066571, filed Nov. 27, 2012, and/or PCT Application No. PCT/US2012/068331, filed Dec. 7, 2012, and/or PCT Application No. PCT/US2013/022119, filed Jan. 18, 2013, and/or PCT Application No. PCT/US2013/027342, filed Feb. 22, 2013, and/or U.S. patent application Ser. No. 13/851,378, filed Mar. 27, 2013; Ser. No. 13/847,815, filed Mar. 20, 2013; Ser. No. 13/785,099, filed Mar. 5, 2013; Ser. No. 13/779,881, filed Feb. 28, 2013; Ser. No. 13/774,317, filed Feb. 22, 2013; Ser. No. 13/774,315, filed Feb. 22, 2013; Ser. No. 13/681,963, filed Nov. 20, 2012; Ser. No. 13/660,306, filed Oct. 25, 2012; Ser. No. 13/653,577, filed Oct. 17, 2012; and/or Ser. No. 13/534,657, filed Jun. 27, 2012, and/or U.S. provisional applications, Ser. No. 61/806,674, filed Mar. 29, 2013; Ser. No. 61/760,366, filed Feb. 4, 2013; Ser. No. 61/733,598, filed Dec. 5, 2012; Ser. No. 61/733,093, filed Dec. 4, 2012; Ser. No. 61/718,382, filed Oct. 25, 2012; Ser. No. 61/710,924, filed Oct. 8, 2012; Ser. No. 61/696,416, filed Sep. 4, 2012; Ser. No. 61/682,995, filed Aug. 14, 2012; Ser. No. 61/682,486, filed Aug. 13, 2012; Ser. No. 61/678,375, filed Aug. 1, 2012; Ser. No. 61/676,405, filed Jul. 27, 2012; Ser. No. 61/666,146, filed Jun. 29, 2012; Ser. No. 61/653,665, filed May 31, 2012; Ser. No. 61/653,664, filed May 31, 2012; and/or Ser. No. 61/648,744, filed May 18, 2012, which are all hereby incorporated herein by reference in their entireties. The system may communicate with other communication systems via any suitable means, such as by utilizing aspects of the systems described in PCT Application No. PCT/US10/038,477, filed Jun. 14, 2010, and/or U.S. patent application Ser. No. 13/202,005, filed Aug. 17, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454; and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012, and/or U.S. patent application Ser. No. 13/534,657, filed Jun. 27, 2012, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361; and/or Ser. No. 13/260,400, filed Sep. 26, 2011, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580; and/or 7,965,336, and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO2012/075250, and/or PCT Application No. PCT/US2012/048993, filed Jul. 31, 2012, and/or PCT Application No. PCT/US11/62755, filed Dec. 1, 2011 and published Jun. 7, 2012 as International Publication No. WO 2012-075250, and/or PCT Application No. PCT/CA2012/000378, filed Apr. 25, 2012, and/or PCT Application No. PCT/US2012/066571, filed Nov. 27, 2012, and/or PCT Application No. PCT/US2012/068331, filed Dec. 7, 2012, and/or PCT Application No. PCT/US2013/022119, filed Jan. 18, 2013, and/or U.S. patent application Ser. No. 13/333,337, filed Dec. 21, 2011, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vision system for a vehicle, said vision system comprising:
   a camera disposed at a vehicle and having a field of view exterior of the vehicle;
   wherein said camera comprises an RGB photosensor array comprising multiple rows of photosensing elements and multiple columns of photosensing elements;
   wherein an in-line dithering algorithm is applied to individual lines of photosensing elements of said photosensor array in order to reduce at least one of (i) color data transmission and (ii) color data processing;
   wherein said in-line dithering algorithm comprises at least one of (i) an in-row dithering algorithm that is applied to individual rows of photosensing elements of said photosensor array and (ii) an in-column dithering algorithm that is applied to individual columns of photosensing elements of said photosensor array;
   wherein said in-line dithering algorithm is operable to determine most significant bits and least significant bits of color data captured by a photosensing element of said photosensor array; and
   wherein said in-line dithering algorithm determines the most significant bits and the least significant bits of first color data captured by a first photosensing element and wherein the least significant bits of the first color data are added to second color data captured by a second photosensing element to generate second adjusted color data, and wherein said in-line dithering algorithm determines the most significant bits and the least significant bits of the second adjusted color data.

2. The vision system of claim 1, wherein in order to determine the most significant bits of the second adjusted color data, said in-line dithering algorithm uses at least one of (i) a weighing function and (ii) a channel specific correction factor.

3. The vision system of claim 2, wherein said in-line dithering algorithm uses a channel specific correction factor and wherein said channel specific correction factor comprises a color specific correction factor.

4. The vision system of claim 2, wherein said in-line dithering algorithm uses a weighing function and wherein said weighing function comprises a linear function.

5. The vision system of claim 4, wherein said linear function comprises a fix factor.

6. The vision system of claim 5, wherein said fix factor is greater than zero and less than or equal to about one.

7. The vision system of claim 2, wherein said in-line dithering algorithm uses a weighing function and wherein said weighing function comprises a non-linear function.

8. The vision system of claim 7, wherein said nonlinear function comprises a filter.

9. The vision system of claim 2, wherein said first and second photosensing elements comprise photosensing elements of a set of photosensing elements, and wherein said first photosensing element is configured to sense a different spectral band of color than said second photosensing element.

10. The vision system of claim 9, wherein, when all of the color data of a set of photosensing elements are processed, the last color data's least significant bits are added to the color data of a photosensing element of a next set of photosensing elements of said individual line of photosensing elements.

11. The vision system of claim 2, wherein said first and second photosensing elements comprise photosensing elements of adjacent sets of photosensing elements, and wherein said first photosensing element is configured to sense the same spectral band of color as said second photosensing element.

12. The vision system of claim 11, wherein, when all of the color data of a set of photosensing elements are processed, the last color data's least significant bits are added to the color data of a respective photosensing element of the next set of photosensing elements of said individual line of photosensing elements.

13. A vision system for a vehicle, said vision system comprising:

a camera disposed at a vehicle and having a field of view exterior of the vehicle;

wherein said camera comprises an RGB photosensor array comprising multiple rows of photosensing elements and multiple columns of photosensing elements;

wherein an in-line dithering algorithm is applied to individual lines of photosensing elements of said photosensor array in order to reduce at least one of (i) color data transmission and (ii) color data processing;

wherein said in-line dithering algorithm comprises at least one of (i) an in-row dithering algorithm that is applied to individual rows of photosensing elements of said photosensor array and (ii) an in-column dithering algorithm that is applied to individual columns of photosensing elements of said photosensor array;

wherein said in-line dithering algorithm is operable to determine most significant bits and least significant bits of color data captured by a photosensing element of said photosensor array;

wherein said in-line dithering algorithm determines the most significant bits and the least significant bits of first color data captured by a first photosensing element and wherein the least significant bits of the first color data are added to second color data captured by a second photosensing element to generate second adjusted color data, and wherein said in-line dithering algorithm determines the most significant bits and the least significant bits of the second adjusted color data; and wherein said in-line dithering algorithm combines the least significant bits of the second adjusted color data of said second photosensing element with color data captured by a third photosensing element of said photosensor array to generate third adjusted color data, and wherein said in-line dithering algorithm determines the most significant bits and least significant bits of the third adjusted color data.

14. The vision system of claim 13, wherein one of (i) said first, second and third photosensing elements comprise different color sensing photosensing elements of a respective photosensing element set and (ii) said first, second and third photosensing elements comprise photosensing elements along said individual line of photosensing elements that are configured to sense a common color.

* * * * *